(12) United States Patent  (10) Patent No.: US 7,286,273 B2
Ikegame                    (45) Date of Patent:     Oct. 23, 2007

(54) LIGHT DEFLECTING DEVICE

(75) Inventor: Tetsuo Ikegame, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/471,041

(22) PCT Filed: Nov. 18, 2002

(86) PCT No.: PCT/JP02/12023

§ 371 (c)(1),
(2), (4) Date: Sep. 4, 2003

(87) PCT Pub. No.: WO03/046639

PCT Pub. Date: Jun. 5, 2003

(65) Prior Publication Data

US 2004/0085604 A1    May 6, 2004

(30) Foreign Application Priority Data

Nov. 27, 2001 (JP) ............................. 2001-360893

(51) Int. Cl.
G02B 26/08 (2006.01)

(52) U.S. Cl. ...................... 359/201; 359/203; 359/225; 359/226

(58) Field of Classification Search ................ 359/198, 359/199, 223–226
See application file for complete search history.

(56) References Cited

U.S. PATENT DOCUMENTS

| 4,021,096 A * | 5/1977 | Dragt ........................ 359/223 |
| 4,488,789 A | 12/1984 | Kenny |
| 4,668,928 A | 5/1987 | Davis et al. |
| 5,110,195 A | 5/1992 | Loney |
| 5,239,361 A | 8/1993 | Burch |
| 5,276,545 A | 1/1994 | Daun et al. |
| 5,550,669 A | 8/1996 | Patel |
| 6,188,502 B1 | 2/2001 | Aoki |
| 6,198,180 B1 | 3/2001 | Garcia |
| 2001/0040744 A1 * | 11/2001 | Sakamoto et al. .......... 359/871 |

FOREIGN PATENT DOCUMENTS

| EP | 0 389 115 A1 | 9/1990 |
| JP | 58-53032 A | 3/1983 |
| JP | 63-267911 A | 11/1988 |
| JP | 4-90506 A | 3/1992 |

(Continued)

Primary Examiner—James Phan
(74) Attorney, Agent, or Firm—Frishauf, Holtz, Goodman & Chick, P.C.

(57) ABSTRACT

An object of the present invention is to provide an optical deflecting device capable of suppressing undesirable vibrations of an optical deflecting element such as a mirror and allowing a plurality of optical deflecting elements to be easily arranged. The optical deflecting device is characterized in that the device has: a moving body 21 having at least two optical deflecting elements 1,31 held to face each other; supporting means having a first supporting member 32 pivot-connected to the moving body 21 between the two optical deflecting elements 1,31, so as to support the moving body 21 to a stationary body 22 such that the moving body 21 is tiltable around at least a first axis; and first driving means 26, 27, 41, 43 for driving the moving body 21 around the first axis.

29 Claims, 19 Drawing Sheets

FOREIGN PATENT DOCUMENTS

| | | |
|---|---|---|
| JP | 6-333241 A | 12/1994 |
| JP | 07-072409 A | 3/1995 |
| JP | 08-82757 A | 3/1996 |
| JP | 08-220455 A | 8/1996 |
| WO | WO98/44571 A1 | 10/1998 |

\* cited by examiner

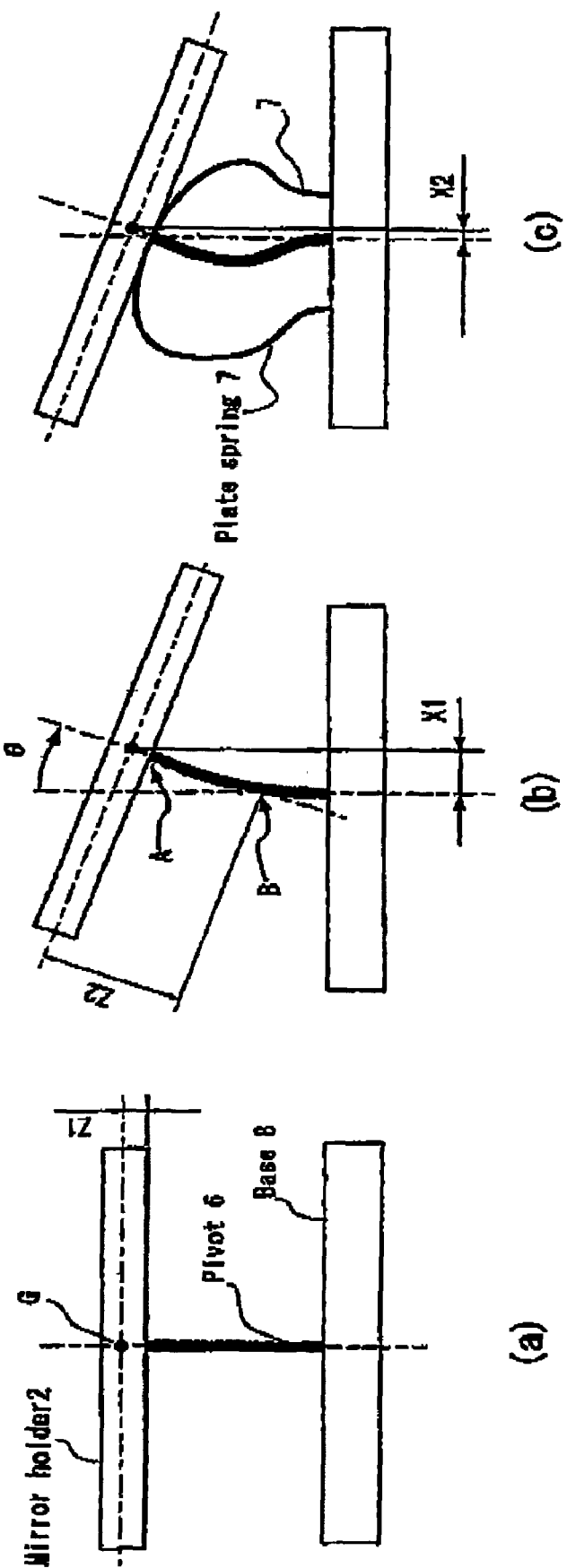

Reference Fig. 2
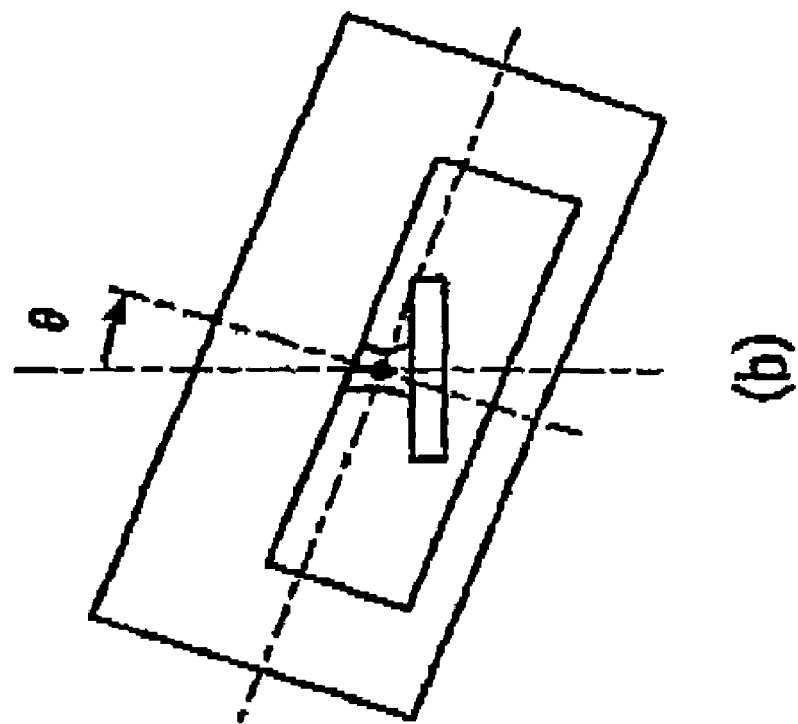
(b)
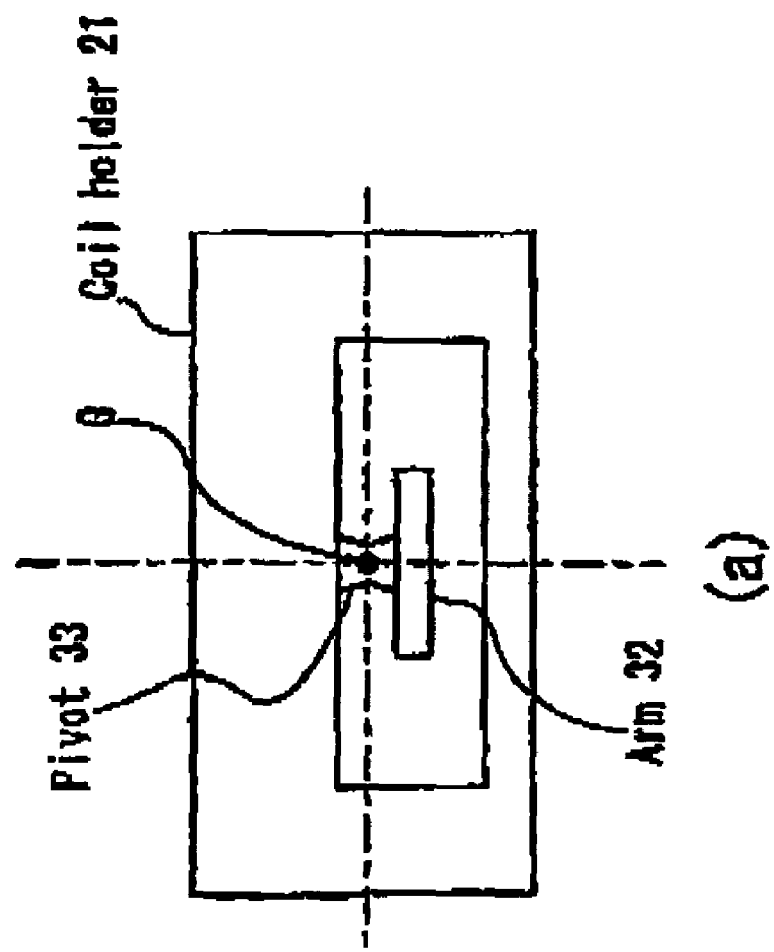
(a)

LIGHT DEFLECTING DEVICE

This application is a U.S. National Phase Application under 35 U.S.C. 371 of International Application PCT/JPL02/12023, filed Nov. 18, 2002.

TECHNICAL FIELD

The present invention relates to an optical deflecting device used for tilting a luminous flux in an information read-write device for reading and/or writing information to and/or from an optical recording medium such as a magnetic optical disk drive, a write-once-read-many optical disk drive, a phase-change optical disk drive, a CD-ROM, a DVD, and an optical card, and in an optical scanner and an optical communication device.

BACKGROUND ART

FIGS. 21 and 22 show conventional optical deflecting devices, respectively, such as those disclosed in Japanese Unexamined Patent Application Publication No. 7-72409.

The optical deflecting device shown in FIG. 21 has a silicon oscillator 103 including integrally formed elements consisting of: a moving plate 100 as a mirror; a frame 101 surrounding therearound; and S-shaped span-bounds 102 for supporting both sides of the moving plate 100 to the frame 101, respectively, thereby allowing the moving plate 100 to tilt around one axis; and this device is constituted to bond the frame 101 onto a glass substrate 105 formed with electrodes, via a spacer 104.

The optical deflecting device shown in FIG. 22 has elements integrally formed of a silicon substrate, consisting of: a mirror portion 110; a mirror outer periphery 111 surrounding therearound; and scanning beams 112 for supporting both sides of the mirror portion 110, respectively, to the mirror outer periphery 111, thereby allowing the mirror portion 110 to be displaced in one axis direction; and the mirror outer periphery 111 is joined to a glass substrate 113.

The glass substrate 113 is formed with: driving electrodes 114 facing the rear surface of the mirror portion; and a gap forming portion 115 for determining a gap between the mirror portion 110 and driving electrodes 114; such that the glass substrate 113 is formed with external lead connecting portions 116 connected to the driving electrodes 114, respectively, outside the mirror outer periphery 111. Covered by insulative coatings 117 are: the surfaces of the driving electrodes 114; and those portions on the glass substrate 113, which are outside the mirror outer periphery 111 and excluding the external lead connecting portions 116.

As shown in FIG. 23, the optical deflecting device shown in FIG. 21 is constituted to tilt the moving plate 100 around an axis comprising the S-shaped span-bounds 102 by electrostatic forces, by applying an electrostatic force between the moving plate 100 and the due electrode on the glass substrate 105, to thereby deflect the reflected light of the light incident on the moving plate 100.

Further, the optical deflecting device shown in FIG. 22 is constituted to tilt the mirror portion 110 around the gap forming portion 115 acting as a fulcrum formed on the glass substrate 113 below the central portion of the mirror portion 110, by applying an electrostatic force between the mirror portion 110 and the due driving electrode 114, thereby deflecting the reflected light of the light incident on the mirror portion 110.

DISCLOSURE OF INVENTION

However, in the conventional optical deflecting device shown in FIG. 21, both sides of the moving plate 100 are supported by the frame 101 through the S-shaped span-bounds 102, respectively, thereby lowering the rigidity in a direction perpendicular to the surface (mirror surface) of the moving plate. This causes a problem of the moving plate 100 being vibrated in the direction perpendicular to the mirror surface due to disturbance such as impact, so that the reflected light at the moving plate 100 is parallely displaced.

In the conventional optical deflecting device shown in FIG. 22, the scanning beams 112 for tiltably supporting the mirror portion 110 are provided at side surfaces of the mirror portion 110, thereby lowering the rigidity in a direction perpendicular to the mirror portion surface (mirror surface). This causes a problem due to disturbance such as impact, that the mirror portion 110 is moved away from the gap forming portion 115 thereby parallely displacing the reflected light due to a force acting on the moving plate 100 in a direction perpendicular to the mirror surface and away from the glass substrate 113, and that the mirror portion 110 is conversely pressed onto the gap forming portion 115 thereby making the tilt of the mirror portion 110 unstable due to a force acting on the mirror portion 110 in the direction perpendicular to the mirror surface and toward the glass substrate 113.

There is a further problem of the glass substrate 113 being formed with the gap forming portion 115 serving as the fulcrum for the mirror portion 110, thereby making it difficult to arrange a mirror for optically detecting the tilt angle of the mirror portion 110 at a rear surface side of the mirror portion 110.

The present invention has been made in view of such problems, and it is therefore an object of the present invention to provide an optical deflecting device capable of suppressing undesirable vibrations of an optical deflecting element and capable of allowing a plurality of optical deflecting elements to be easily arranged.

To achieve the above object, the present invention relates to: an optical deflecting device comprising:

an optical deflecting element having a predetermined deflecting surface for deflecting a direction of light;

a first supporting member for rotatably holding a moving body including at least the optical deflecting element to a stationary body;

a driving part for rotating the optical deflecting element around a predetermined axis of rotation; and a pivot for coupling the moving body and the stationary body to each other.

In a preferred configuration of the present invention, the pivot is disposed substantially perpendicularly to the deflecting surface.

In another preferred configuration of the present invention, the pivot is disposed near the center of gravity of the moving body.

In yet another preferred configuration of the present invention, the pivot is disposed at a substantially central portion of the optical deflecting element at that rear surface side of the deflecting element which is opposite to the deflecting surface.

In still another preferred configuration of the present invention, the pivot is constituted to have a damping function.

BRIEF DESCRIPTION OF THE DRAWINGS

FIG. 1 is a view for explaining deflecting action in an embodiment of an optical deflecting device according to the present invention;

FIG. 2 is an external perspective view of the whole of the optical deflecting device as viewed diagonally from the upper right of the front side thereof;

OPTIMUM FORM FOR EMBODYING THE INVENTION

Embodiments relating to an optical deflecting device according to the present invention will be described hereinafter with reference to the accompanying drawings.

Figure 3:
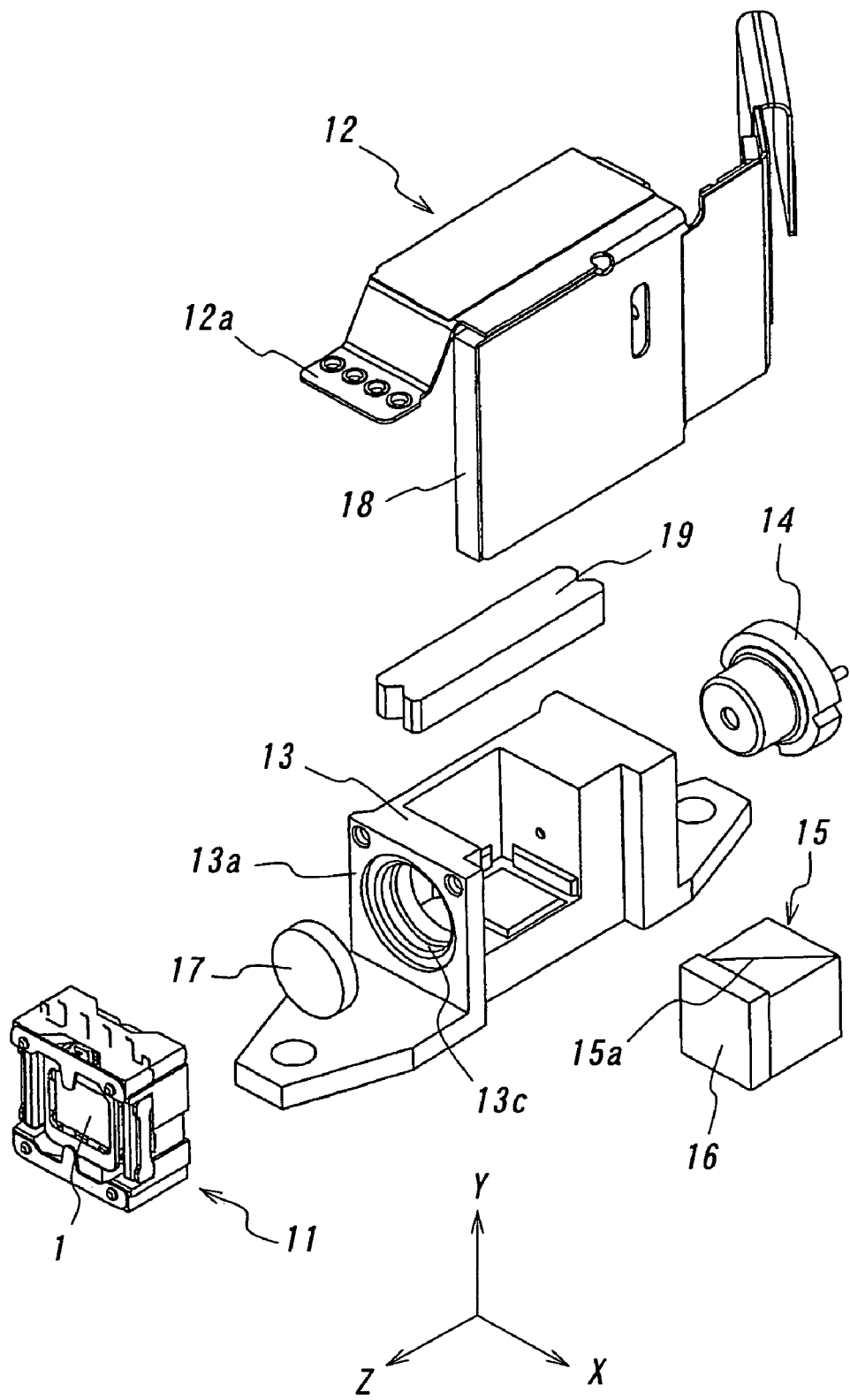
FIG. 3 is an exploded perspective view in the same direction as FIG. 2.
Figure 4:
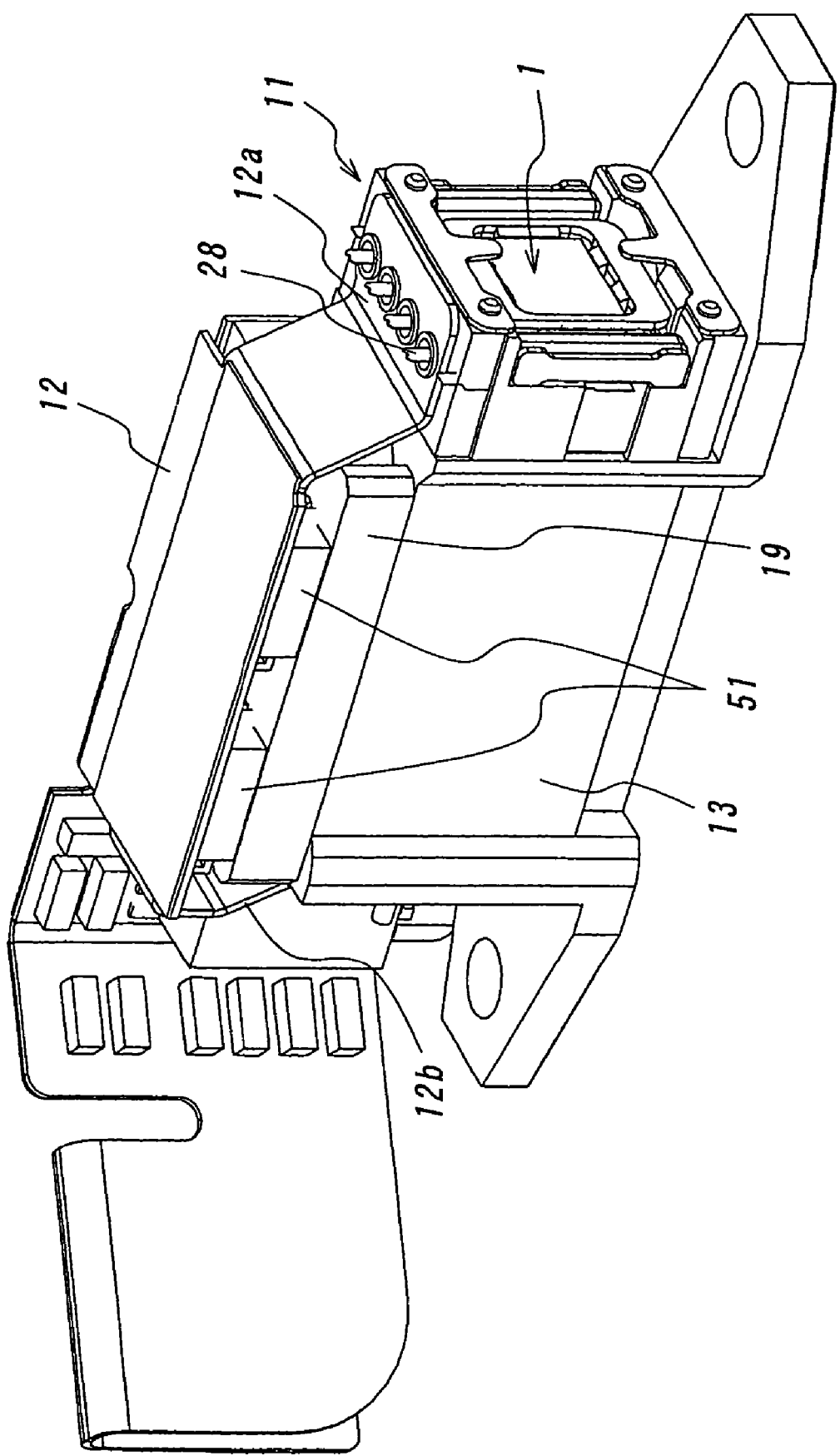
FIG. 4 is an external perspective view of the whole of the optical deflecting device as viewed diagonally from the upper left of the front side thereof.
Figure 5:
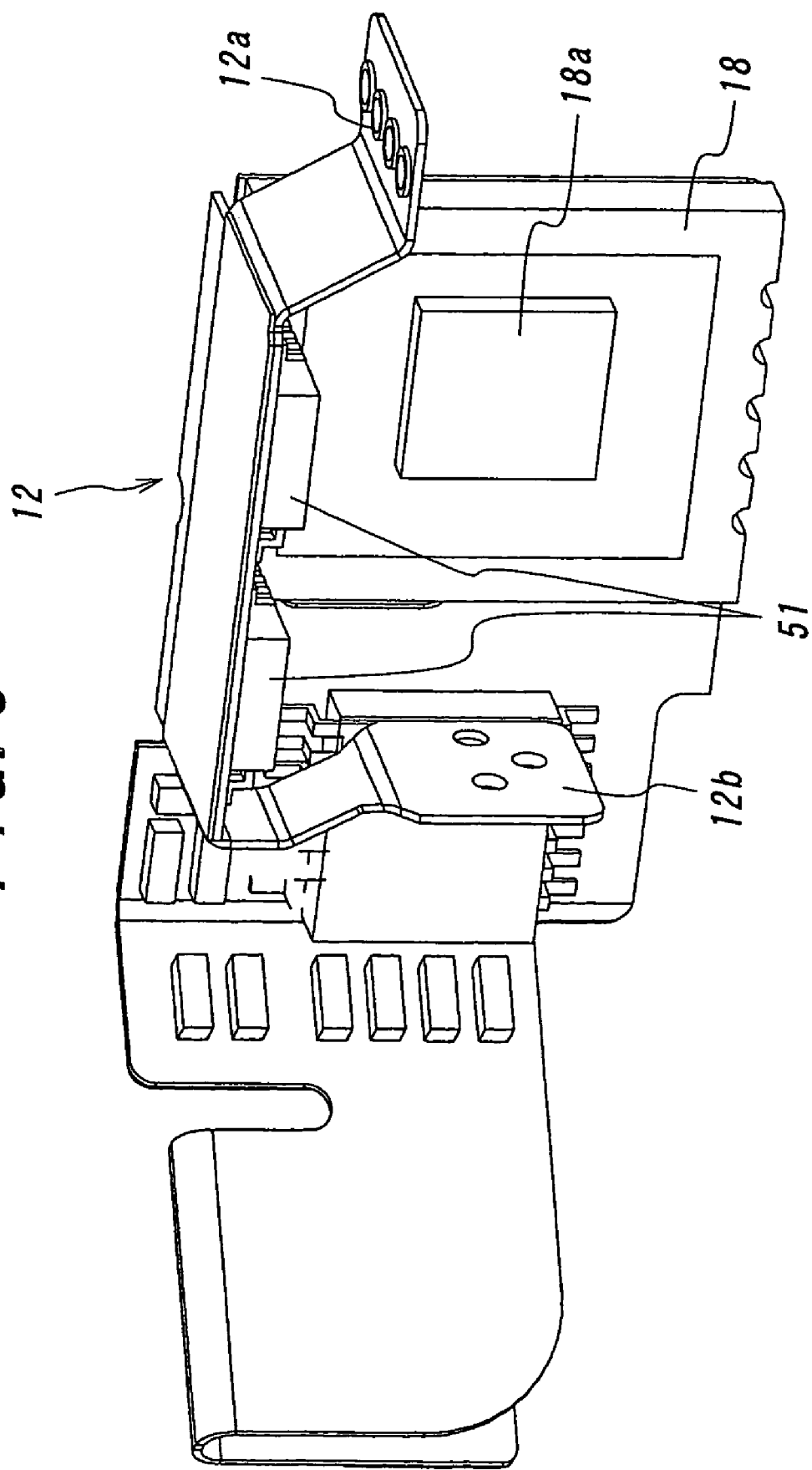
FIG. 5 is a perspective view of a flexible printed circuit board (FPC) shown in FIG. 2 as viewed from the upper left thereof.
Figure 6:
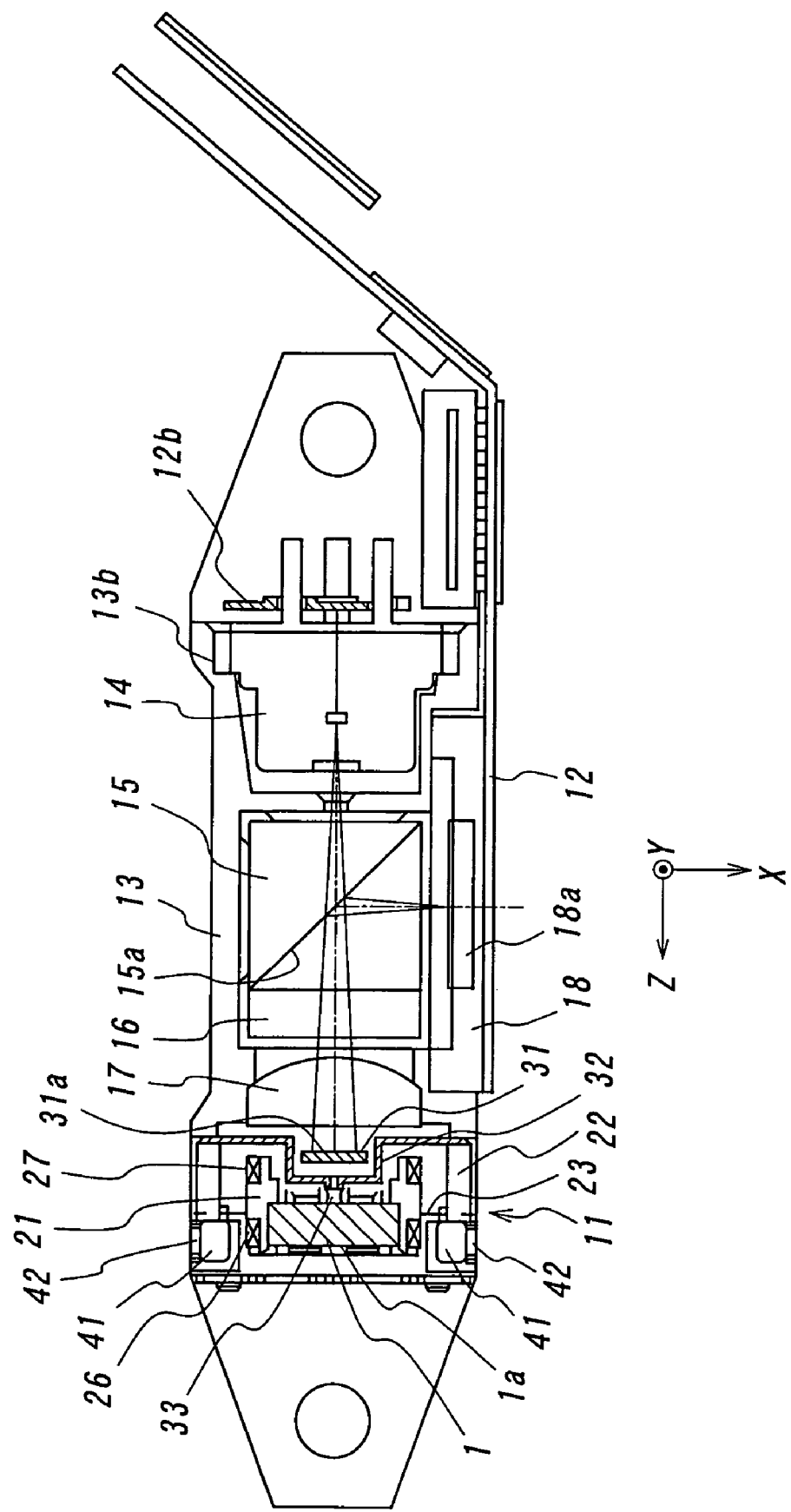
FIG. 6 is a transverse plan view of the optical deflecting device.
Figure 7:
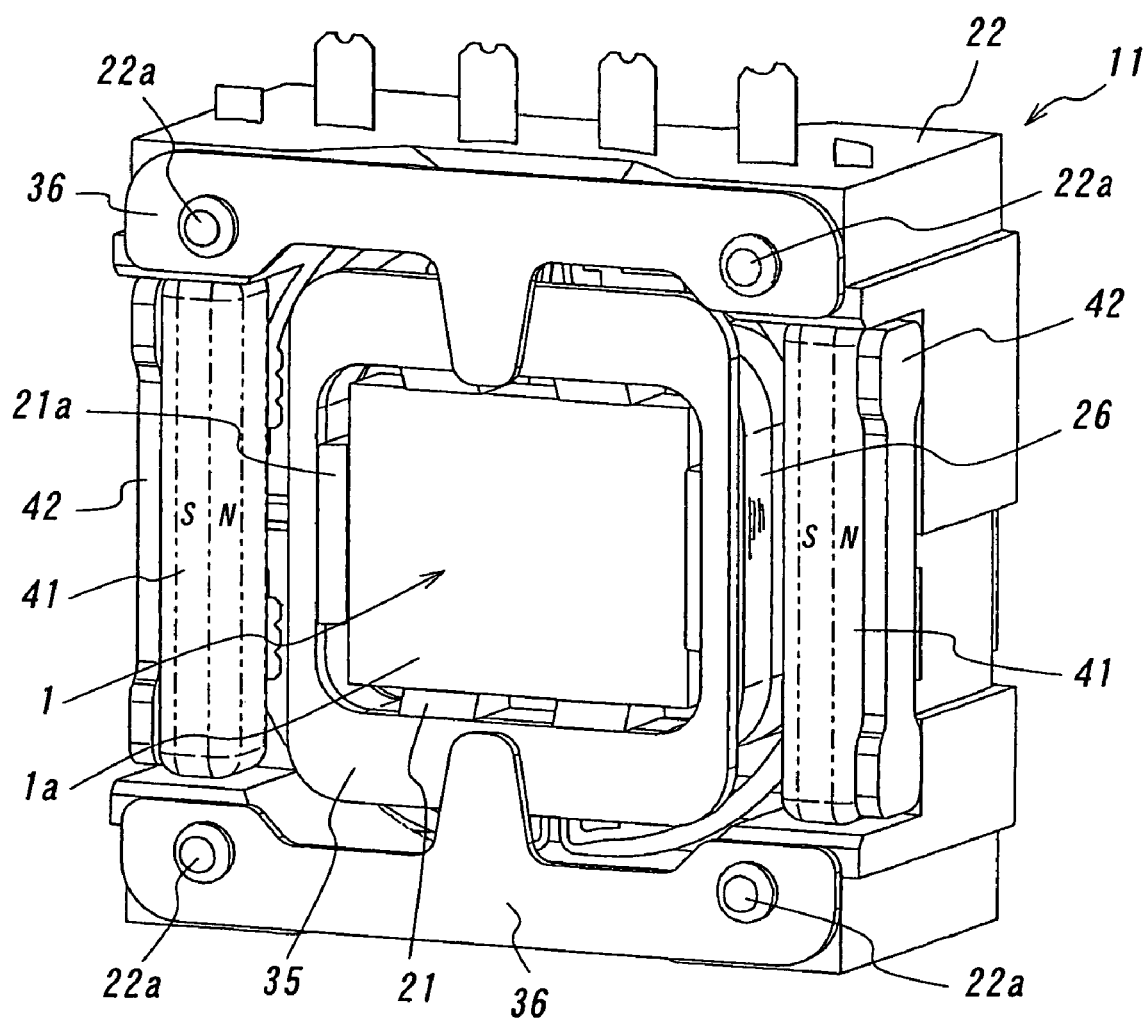
FIG. 7 is a front perspective view of the optical deflector shown in FIG. 2.
Figure 8:
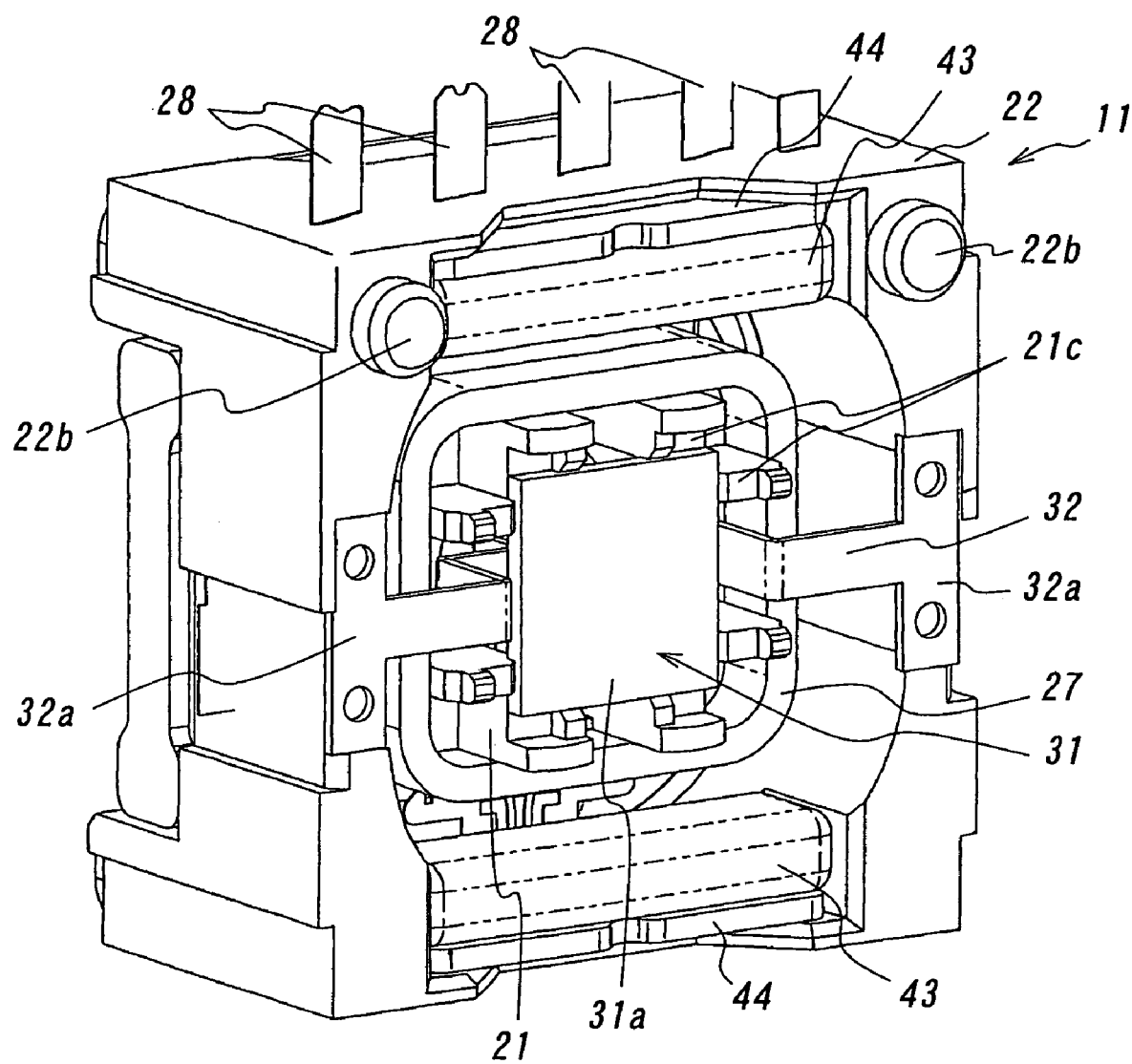
FIG. 8 is a rear perspective view of the optical deflector.
Figure 9:
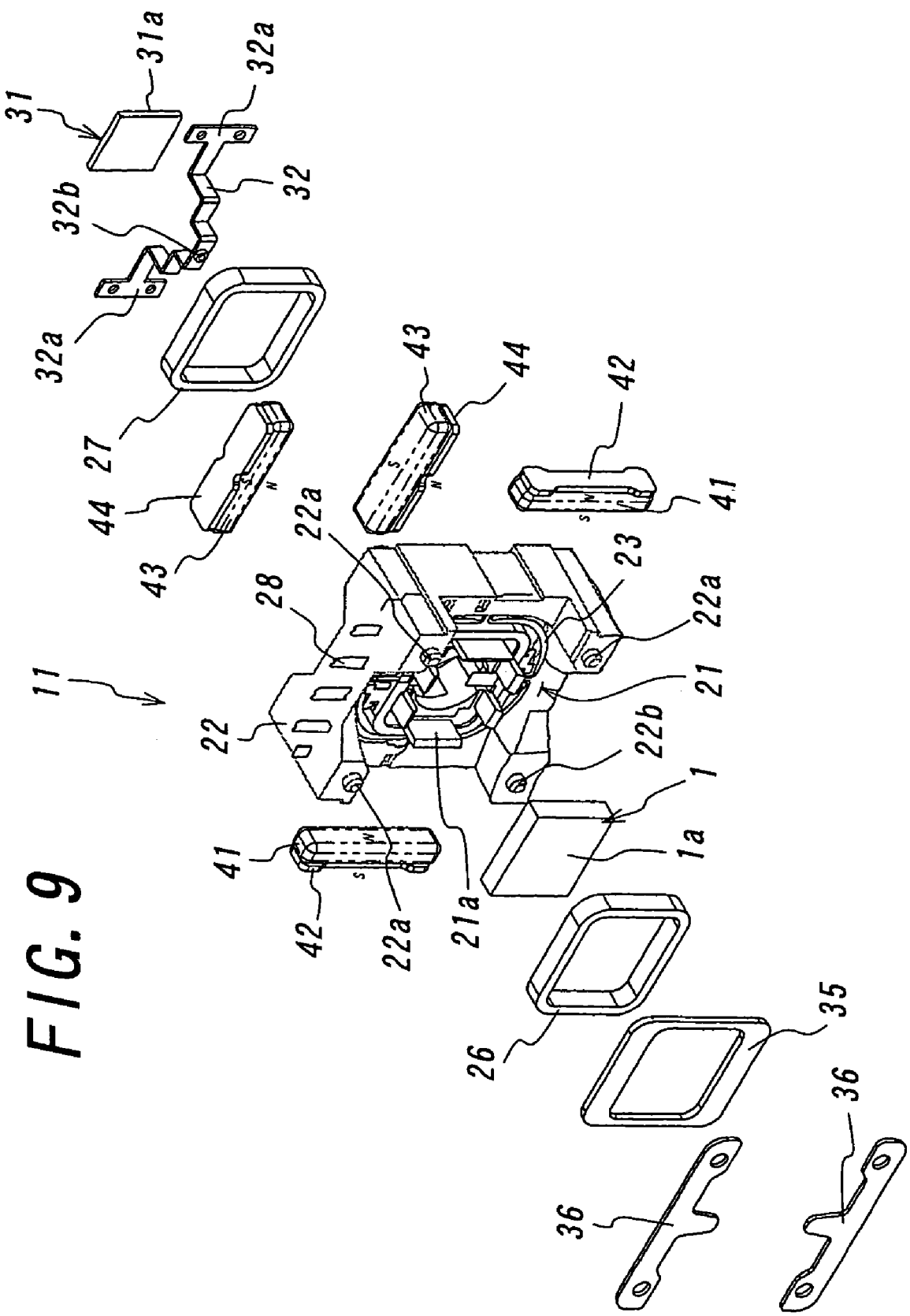
FIG. 9 is an exploded perspective view of the optical deflector.
Figure 10:
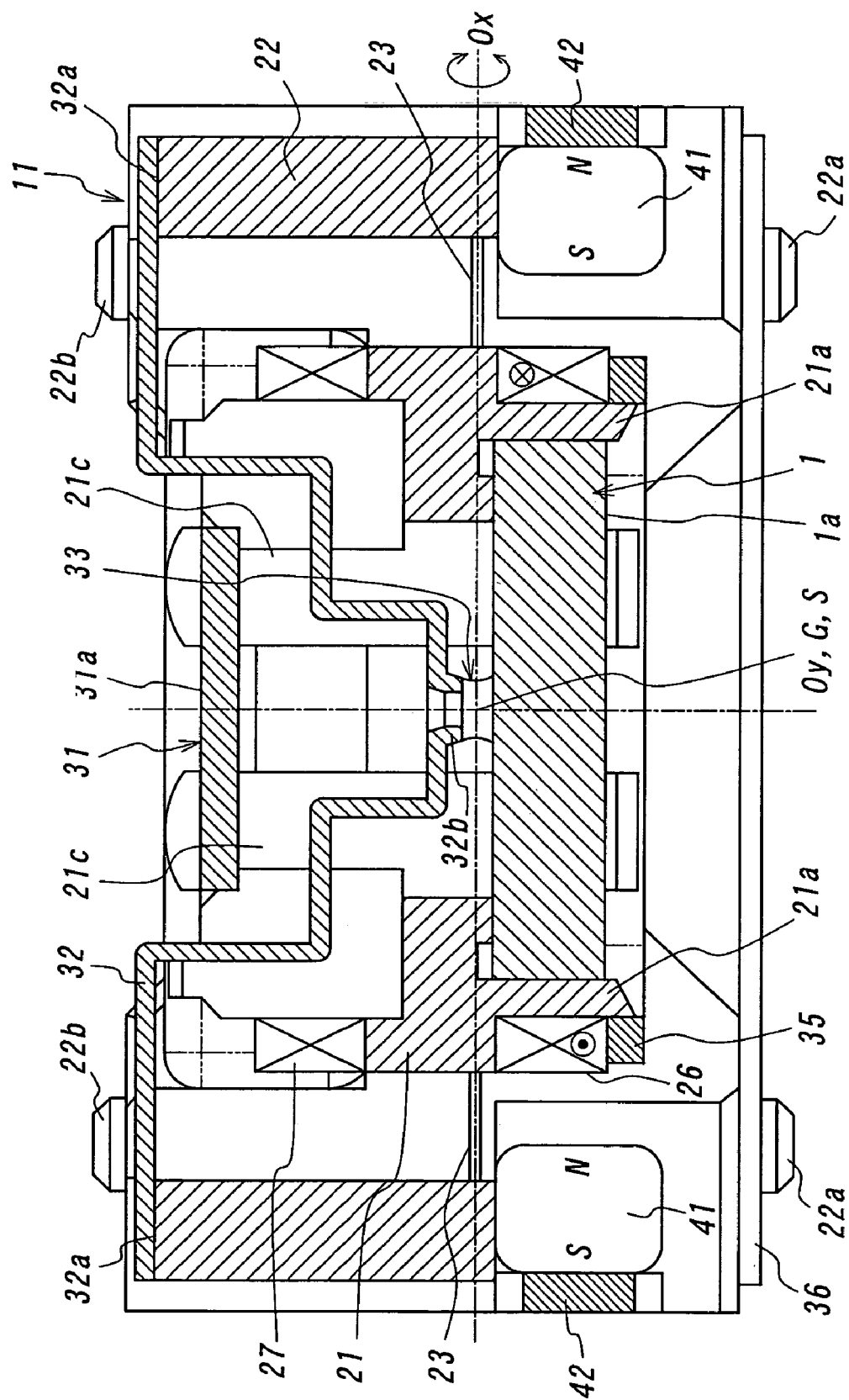
FIG. 10 is a longitudinal cross-sectional view of the optical deflector.
Figure 11:
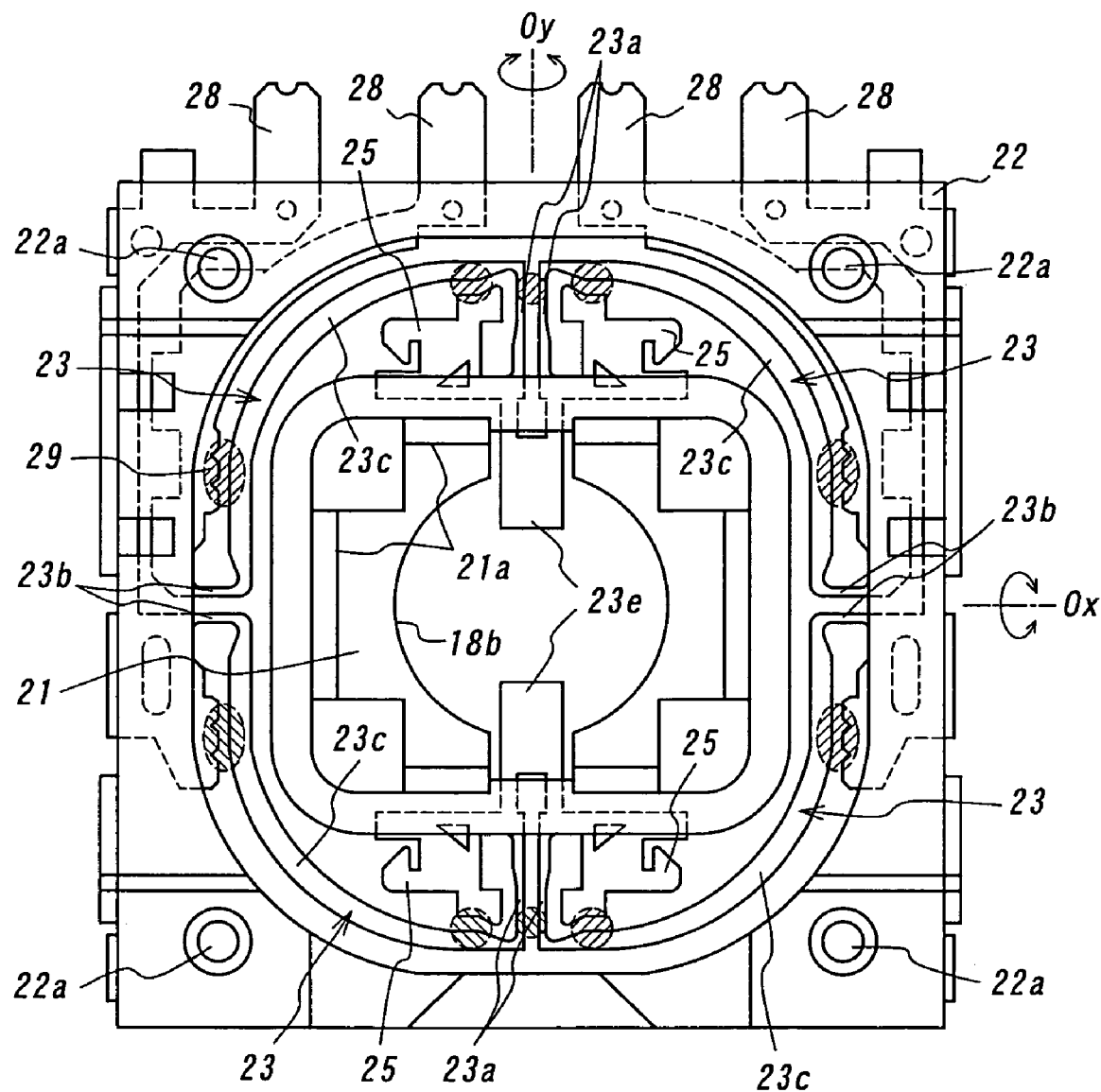
FIG. 11 is a view for explaining the mounting configuration of springs shown in FIG. 9.

FIGS. 1 through 11 show an embodiment of the present invention. FIG. 1 is a view for explaining a deflecting action. FIG. 2 is an external perspective view of the whole of the device as viewed diagonally from the upper right of a front side thereof. FIG. 3 is an exploded perspective view in the same direction as FIG. 2. FIG. 4 is an external perspective view of the whole of the device as viewed diagonally from the upper left of the front side thereof. FIG. 5 is a perspective view of a flexible printed circuit board (FPC) as viewed from the upper left thereof. FIG. 6 is a transverse plan view. FIG. 7 is a front perspective view of the optical deflector. FIG. 8 is a rear perspective view of the optical deflector. FIG. 9 is an exploded perspective view of the optical deflector. FIG. 10 is a longitudinal cross-sectional view of the optical deflector. FIG. 11 is a view for explaining the mounting configuration of springs shown in FIG. 9.

The optical deflecting device of this embodiment is used to switch an optical-path for optical communication. As shown in FIG. 1, this device is constituted to drive a mirror 1 as an optical deflecting element selectively around an axis of rotation Ox parallel to an X-axis and an axis of rotation axis Oy parallel to a Y-axis perpendicular to the X-axis so as to reflect an incident light 5 for optical communication to be projected as parallel light from a single optical fiber 3 via a lens 4, such that a reflected light 6 is incident on one of nine lenses 7-1 to 7-9 juxtaposed in three layers in a plane substantially orthogonal to the reflected light 6 and is convergedly incident on the corresponding one of nine optical fibers 8-1 to 8-9. That is, the reflected light 6 at the mirror 1 is deflected in an X direction as a right-and-left direction in FIG. 1 by tilting the mirror 1 around the rotation axis Oy and is deflected in a Y-direction as an up-and-down direction in FIG. 1 by tilting the mirror 1 around the rotation axis Ox, so that the reflected light 6 is selectively incident on one of the nine lenses 7-1 to 7-9 and then is incident on the corresponding one of the optical fibers 8-1 to 8-9, thereby selecting the one from the nine optical fibers 8-1 to 8-9 which is to output the light emitted from the single optical fiber 3 at the incident side.

As shown in FIGS. 2 through 6, the optical deflecting device of this embodiment has an optical deflector 11 having the mirror 1, an FPC 12, a housing 13, a semiconductor laser 14, a polarization beam splitter (PBS) 15, a ¼ wave plate 16, a collective lens 17, a semiconductor position sensitive detector (PSD) 18, and a spacer 19.

As shown in FIGS. 7 through 11, the optical deflector 11 has a coil holder 21 as a moving body and a magnet holder 22 as a stationary body. The coil holder 21 and magnet holder 22 are molded from a non-conductive plastic such as a liquid crystal polymer or epoxy resin including glass fibers or titanium acid whiskers. As shown in FIG. 11 in detail, four springs 23 as second supporting members formed from an etched beryllium copper foil of 20 μm thickness having a gold plate on the surface thereof, are held at both ends by insert-molding the moving-body side ends and stationary-body side ends of these springs into the coil holder 21 and magnet holder 22, respectively, upon molding. Note that two springs of each spring pair are insert-molded upon molding by connecting them via a connecting portion 23e at the coil holder 21 side, and the connecting portion 23e is cut away after molding to thereby separate the two springs from each other. This allows the springs 23 to be positioned and held into the mold at the coil holder 21 side upon insert-molding, thereby insert-molding the springs into the coil holder 21 more precisely.

The four springs 23 are fixed at one end thereof to four spots close to the rotation axis Oy, two on one side and two on the other side of the coil holder 21, and each spring 23 has a first deformed portion 23a, which is formed to be parallel to the rotation axis Oy in the vicinity of the fixed end thereof. The four springs 23 are fixed at the other ends thereof to four spots close to the rotation axis Ox, two on one side and two on the other side of the magnet holder 22, and each spring 23 has a second deformed portion 23b, which is formed to be parallel to the rotation axis Ox, in the vicinity of the other fixed end thereof. Connecting portions 23c connecting the first and second deformed portions 23a and 23b are disposed to surround the four corners of the coil holder 21. Each of the deformed portions 23a, 23b of the springs 23 has a width (in a direction parallel to the X-Y plane) of 50 to 100 µm, and each connecting portion 23c has a width of 100 to 400 µm which is wider than the deformed portions 23a, 23b. Further, the width of each of deformed portions 23a, 23b and connecting portions 23c is larger than each thickness of 20 µm (in the Z-direction).

In the vicinity of the first deformed portions 23a, soldering portions 25 connected to the first deformed portions 23a in the coil holder 21 are formed, and both end terminals of each of first coil 26 and second coil 27 to be described later are duly fixed to the four soldering portions 25 with a conductive adhesive.

The ends of the second deformed portions 23b are inserted into the magnet holder 22, extend through the magnet holder 22, and reach four terminals 28, respectively. These four terminals 28 are soldered to a soldering portion 12a of the FPC 12, and electric power is fed from the FPC 12 to the first and second coils 26, 27 through the four springs 23, respectively.

Ultraviolet-curing silicone-gel dampers 29 connect the adjacent two of first deformed portions 23a to each other, the connecting portions 23c and soldering portions 25 to each other, and the connecting portions 23c and magnet holder 22 to each other, thereby damping both ends of the springs 23.

The mirror 1 is fixed to fixing portions 21a in the middle of the coil holder 21 at its front surface, by positioning and bonding the outer periphery of the mirror to the fixing portions. The mirror 1 is constituted of: a body portion made of silicon, cut-formed or molded plate-like glass, acrylic resin or cyclo-olefin polymer (such as ZEONEX/ZEONOR of ZEON Corporation, or ARTON of JSR Corporation); and a reflection surface 1a coated with gold or multilayered dielectric film having a higher reflectivity to light of wavelengths for optical communication from 1.3 µm to 1.6 µm, for example.

Note that the mirror 1 may be integrally formed with the coil holder 21. That is, the mirror 1 may be substituted by an aluminum film, gold or multilayered dielectric film coated onto an arbitrary portion of the surface of the coil holder 21.

Fixing portions 21c are formed in the middle of the rear surface of the coil holder 21, in a manner to position and firmly bond a periphery of a mirror 31 for constituting an angle sensor for the mirror 1 to these fixing portions. The mirror 31 is formed by a silicon wafer having a thickness of 0.2 mm, for example, and has a reflection surface 31a coated with gold having a higher reflectivity to light of wavelengths for sensor such as a wavelength of 780 nm.

At the front and rear surfaces of the coil holder 21, the first coil 26 and second coil 27 are firmly bonded to the coil holder 21 so as to surround the mirror 1 and mirror 31, respectively, by positioning the inner sides of the coils to the fixing portions 21a, 21c, respectively.

As shown in FIG. 10 in detail, positioned in the space between two mirrors 1, 31 is a central portion of an arm 32 as a first supporting member formed by bending a stainless plate having a thickness of 0.1 mm, for example, and the arm 32 has both ends 32a disposed and firmly bonded to the magnet holder 22 so as to surround the outer periphery of the mirror 31. The arm 32 is formed at its central portion with a conical projection 32b having a central hole and positioned to be apart from the rear surface of the mirror 1 by a gap of 0.2 mm, for example, so as to form a substantially cylindrical pivot 33 by injecting a damping agent including silicone rubber, silicone gel, or oil such as SUPER X of Cemedine Co., Ltd., and TB3164, TB1220D, TB1530C of Three Bond Co., Ltd., between the projection 32b and mirror 1, and by curing the damping agent by moisture, ultraviolet light or heat, for example, if required. Note that the pivot 33 is formed such that the rotation axes Ox, Oy and the center of gravity G of the moving body having the coil holder 21 are positioned in the middle of the pivot 33.

Note that the pivot 33 may be constituted of an addition-type silicone adhesive such as JCR6125 (Dow Corning Toray), JCR6126 (Dow Coming Toray), SE9186L (Dow Coming Toray), SE1821 (Dow Coming Toray), KE1031 (Shin-Etsu Chemical Co., Ltd.) and KE109 (Shin-Etsu Chemical Co., Ltd.) other than the above-mentioned damping agents. In this case, the compression strain of the pivot is reduced to thereby exhibit a higher positional stability, because no residual strain is caused in a stationary state even when the pivot is largely deformed upon driving the optical deflecting device, for example. Among the above-mentioned addition-type silicone adhesives, KE109 can be particularly utilized.

When higher positional stability is not required, it is possible to adopt a damping agent such as the above-mentioned SUPER X. It is further possible to exemplarily adopt TSE3221S (GE Toshiba) or FE-61 (Shin-Etsu Chemical Co., Ltd.) of a one-component addition-type.

Bonded onto the first coil 26 is a square frame-like stopper 35 at the front surface of the optical deflector 11, and four cornres of the front surface of the square frame-like magnet holder 22 are formed with bosses 22a, respectively, so as to bond two T-shaped covers 36 to the magnet holder 22 based on the bosses 22a, thereby allowing the covers 36 to abut onto the stopper 35. This causes the stopper 35 to abut onto projections in the middle of the covers 36 when the moving body is moved in a direction orthogonal to the reflection surface 1a of the mirror 1 due to external vibrations, for example, thereby preventing an excessive movement of the moving body.

Two magnets 41 for the first coil 26 and two magnets 43 for the second coil 27, which are magnetized as exemplarily shown in FIG. 9, have yokes 42 and 44 bonded to the backs thereof, respectively, and firmly fixed to the magnet holder 22.

In the optical deflector 11 having the above-described configuration, the coil holder 21, first coil 26, second coil 27, mirror 1 and mirror 31 cooperatively constitute the moving body, such that the center of gravity G of the moving body lies on the rotation axes Ox, Oy and the principal inertia axis S of the moving body coincides the rotation axes Ox, Oy as shown in FIG. 10. The springs 23 are disposed to lie in the plane including the rotation axes Ox, Oy, and the first and second deformed portions 23a and 23b are placed so as to substantially coincide the rotation axes Oy and Ox, respectively. Further, the first coil 26 is placed at a position closer to the springs 23 than the second coil 27, thereby causing the center of gravity of the moving body including the mirror 1 to lie on the rotation axes Ox, Oy without using a balancer.

This optical deflector 11 is duly positioned and firmly bonded to the housing 13, by fitting two bosses 22b formed at the rear surface of the square frame-like magnet holder 22, into two holes formed at a fixing surface 13a of the housing 13 such as molded by zinc die-casting, respectively.

As shown in FIG. 6, the semiconductor laser 14, PBS 15, ¼ wave plate 16, collective lens 17 and PSD 18 are fixed to the housing 13 so as to detect a tilt angle of the mirror 1 from a tilt angle of the mirror 31. The semiconductor laser 14 is mounted into an opening 13b of the housing 13, the PBS 15 is bonded at its one side to a pedestal of the housing 13, the ¼ wave plate 16 is joined to the PBS 15, the collective lens 17 is fixed to an opening 13c formed in the fixing surface 13a of the housing 13 for the optical deflector 11, and the PSD 18 is bonded to the housing 13.

The semiconductor laser 14 has three terminals soldered to a soldering portion 12b of the FPC 12, and also the PSD 18 is soldered to the FPC 12. The PSD 18 is a two-dimensional position sensor that outputs the center position of light in the two directions projected on a light receiving portion 18a thereof as an electric current; and S5990-01, S7848-01, etc., made by Hamamatsu Photonics K. K., is used as the PSD 18.

The FPC 12 is installed with a circuit for converting the output electric current of the PSD 18 into a voltage, and with drive circuits 51 for the first and second coils 26, 27. The drive circuits 51 are fixed to abut the surfaces thereof onto the spacer 19 made of aluminum fixed at an upper portion of the PBS 15 of the housing 13, thereby causing the spacer 19 and housing 13 to also serve as heat dissipating members for the drive circuits 51.

In the optical deflecting device having such a configuration, when an electric current is applied to the first coil 26 via two of the four springs 23, the moving body generates a torque around the rotation axis Oy by interacting with the magnetic fields generated by the magnets 41, mainly causing the first deformed portions 23a of the four springs 23 to be twisted, causing the pivot 33 to be flexed, and causing the moving body to tilt around the rotation axis Oy.

Further, when an electric current is applied to the second coil 27 via other two of the four springs 23, the moving body generates a torque around the rotation axis Ox by interacting with the magnetic fields generated by the magnets 43, mainly causing the second deformed portions 23b of the four springs 23 to be twisted, causing the pivot 33 to be flexed, and causing the moving body to tilt around the rotation axis Ox.

Meanwhile, as shown in FIG. 6, the light from the semiconductor laser 14 is incident on the PBS 15 as P-polarized light, passes through a polarizing surface 15a, and is incident on the reflection surface 31a of the mirror 31 through the ¼ wave plate 16 and collective lens 17. The light reflected by the mirror 31 is incident on the PBS 15 through the condensing lens 17 and ¼ wave plate 16. Since the light reflected by the mirror 31 and incident on the PBS 15 passes through the ¼ wave plate 16 twice in the emitting and returning paths, and changes to S-polarized light which is deflected by 90 degrees, the S-polarized light is reflected by the polarizing surface 15a of the PBS 15 and is incident on the light receiving portion 18a of the PSD 18.

When the mirror 1, i.e., the mirror 31 tilts around the rotation axis Oy by applying electric current to the first coil 26, the light on the light receiving portion 18a of the PSD 18 moves in the Z-direction on the light receiving portion 18a shown in FIG. 6, and when mirror 1 tilts around the rotation axis Ox by applying electric current to the second coil 27, the light on the light receiving portion 18a moves in the Y-direction on the light receiving portion 18a shown in FIG. 6, thereby allowing the PSD 18 to detect a two-dimensional angle of the mirror 1 with an output thereof.

The optical deflecting device of this embodiment allows obtaining the advantages to be explained hereinafter. That is, the arm 32 never interferes with the light beams incident on and reflected by the mirrors 1, 31, because the central portion of the arm 32 as the first supporting member is positioned within the space between the two mirrors 1, 31 shown in FIG. 10, such that both ends 32a of the arm 32 are disposed to surround the outer periphery of the mirror 31 and firmly bonded to the magnet holder 22 and such that the central portion of the arm 32 is coupled via pivot 33 to the rear surface of the mirror 1 acting as a part of the moving body, thereby allowing the moving body such as having the two mirrors 1, 31 and coil holder 21 to tilt around the rotation axes Ox, Oy perpendicular to the magnet holder 22 as the stationary body. Since the pivot 33 is arranged between the two mirrors 1, 31 as optical components, the pivot 33 never interferes with the light beams incident on and reflected by the mirrors 1, 31. The four springs 23 are provided by etching a foil in parallel to the X-Y plane shown in FIG. 3, so that the four springs 23 extend within the X-Y plane. Thus, each of the four springs 23 has a lower rigidity in the spring thickness direction orthogonal to the X-Y plane and in the direction orthogonal to the reflection surface 1a acting as the deflecting surface of the mirror 1, than in the X and Y directions. Contrary, the pivot 33 is formed into a rotationally symmetric body shape such as a substantially cylindrical or drum shape so as to extend in a direction orthogonal to the reflection surfaces 1a, 31a of the mirrors 1, 31, respectively, thereby allowing to enhance the rigidity in this orthogonal direction and thus to remarkably enhance the rigidity of the moving body in this orthogonal direction. For example, although the moving body has a resonance frequency of about 80 Hz in the above-described orthogonal direction when the moving body is supported by only the springs 23 acting as the second supporting members, the resonance frequency of the moving body in the above-described orthogonal direction can be improved to as high as 400 Hz by adding the arm 32 acting as the first supporting member coupled to the moving body via pivot 33 so as to support the moving body.

The pivot 33 is arranged near the center of rotation of the moving body, thereby allowing restricting an increase of rigidity upon tilting the moving body, to suppress the deterioration of driving sensitivity upon tilting, to minimize the deformation of the pivot 33 upon tilting the moving body, and to prevent the stress breakage of the pivot 33.

Since the moving body is tiltably supported by two types of supporting members consisting of the four springs 23 made of metal arranged to surround the moving body and the arm 32 coupled to the moving body via pivot 33, power feeding to the first and second coils 26, 27 supported by the moving body can be conducted via springs 23, and the rigidity in the direction orthogonal to the mirrors 1, 31 can also be increased.

Since the arm 32 supporting the moving body via pivot 33 is arranged within the space between the mirror 31 and coil holder 21 so as to surround the mirror 31, it becomes unnecessary to form a deep slit or the like in the coil holder 21 for disposing therein the arm 32, thereby allowing to arrange the arm 32 without deteriorating the rigidity of the coil holder 21 and without interfering with the springs 23.

Since the four electrically conductive springs are provided as independent supporting members, these four springs 23 can also serve as totally four power feeders to be connected to both terminals of first and second coils 26, 27, respectively, for driving the moving body around two orthogonal rotation axes Oy and Ox. This eliminates the necessity of flexible cables or the like for forming power feeders to the first and second coils 26, 27, thereby avoiding affection on the supporting and driving operations for the moving body.

Both ends of each of the four springs 23 are insert-molded into the coil holder 21 and magnet holder 22 formed of a non-conductive plastic, respectively, thereby allowing to prevent the four springs 23 from contacting with one another and to easily position these springs 23. Further, since the soldering terminals 28 are provided through the inside of the stationary-side magnet holder 22 from those portions of the four springs 23 which are inserted into the magnet holder 22, the electrical connection to the springs 23 can be easily achieved.

Since the first and second coils 26, 27 for two-dimensional driving held in the coil holder 21 integrally with the mirrors 1, 31 are arranged to sandwich, between these coils 26, 27, the springs 23 encircling a two-dimensional center of rotation and tiltably supporting the coil holder 21 of the moving body, the center of driving torque generated by the moving body including the first and second coils 26, 27 is not so far away from the center of rotation. It is also easy to allow the center of gravity of the moving body including the first and second coils 26, 27 coinciding the center of rotation, thereby suppressing occurrence of undesirable resonance upon tiltingly driving the mirrors 1, 31 and obtaining excellent servo characteristics.

Since the first and second coils 26, 27 are separately placed in the direction perpendicular to the reflection surfaces of the mirrors 1, 31 and disposed at both sides of the springs 23, the first and second coils 26, 27 and the magnets 41, 43 serving as magnet circuits for the respective coils are easily disposed to prevent interference with each other, thereby allowing to reduce mutual magnetic interference of the magnets 41, 43 and to minimize disturbances in the magnetic fields acting on the first and second coils 26, 27.

The dampers 29 (see FIG. 11) disposed at both ends of the springs 23 effectively reduce vibrations of the springs 23.

Since the angle sensor for detecting the angle of the mirror 1 is disposed at the rear surface side of the reflection surface 1a of the mirror 1, the angle sensor never interferes with the main light beams to be deflected by the mirror 1.

Referring now to FIGS. 12 through 17, modified embodiments of the above-described embodiment will be described.

Figure 12:
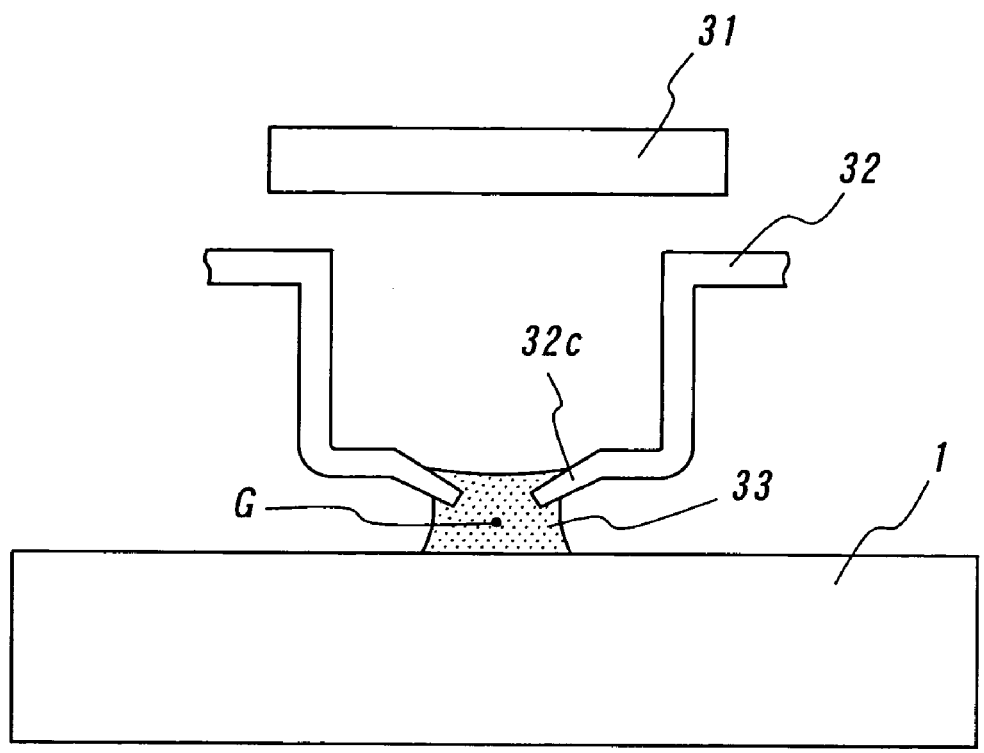
FIG. 12 is a view showing a configuration of the major part of a first modified embodiment of the optical deflecting device shown in FIG. 2.

FIG. 12 is a view showing a configuration of the major part of a first modified embodiment. In this first modified embodiment, the central portion of the arm 32 is formed with a conical projection 32c having a conical hole, and the damping agent is coated onto the inside of the conical hole, such that the damping agent leaked from the hole hangs down to the rear surface of the mirror 1, thereby forming the pivot 33. In this way, the pivot 33 can be easily formed.

Figure 13:
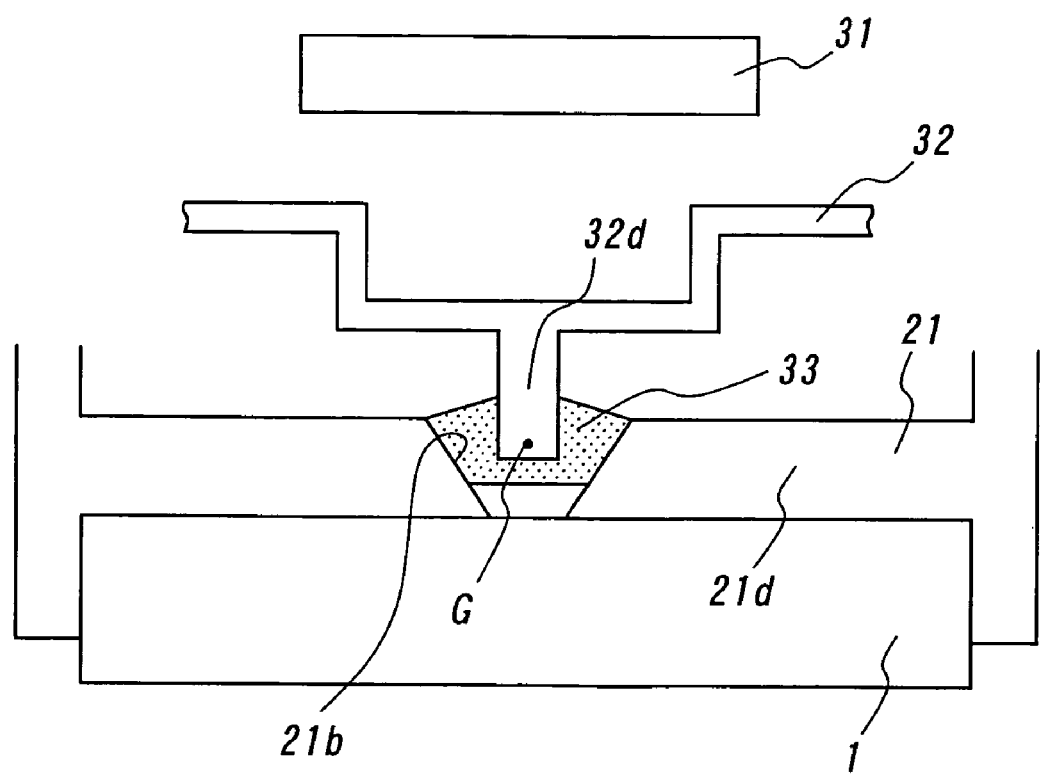
FIG. 13 is a view showing a configuration of the major part of a second modified embodiment.

FIG. 13 is a view showing a configuration of the major part of a second modified embodiment. In this second modified embodiment, the central portion of the arm 32 is formed with a cylindrical projection 32d while providing a wall of the coil holder 21 at the rear surface side of the mirror 1, and the wall is formed with a conical concave portion 21b, such that the tip end of the projection 32d is positioned in the concave portion 21b so as to inject the damping agent into the concave portion 21d, thereby forming the pivot 33. This allows adopting a damping agent having a quality apt to flow out before curing.

Figure 14:
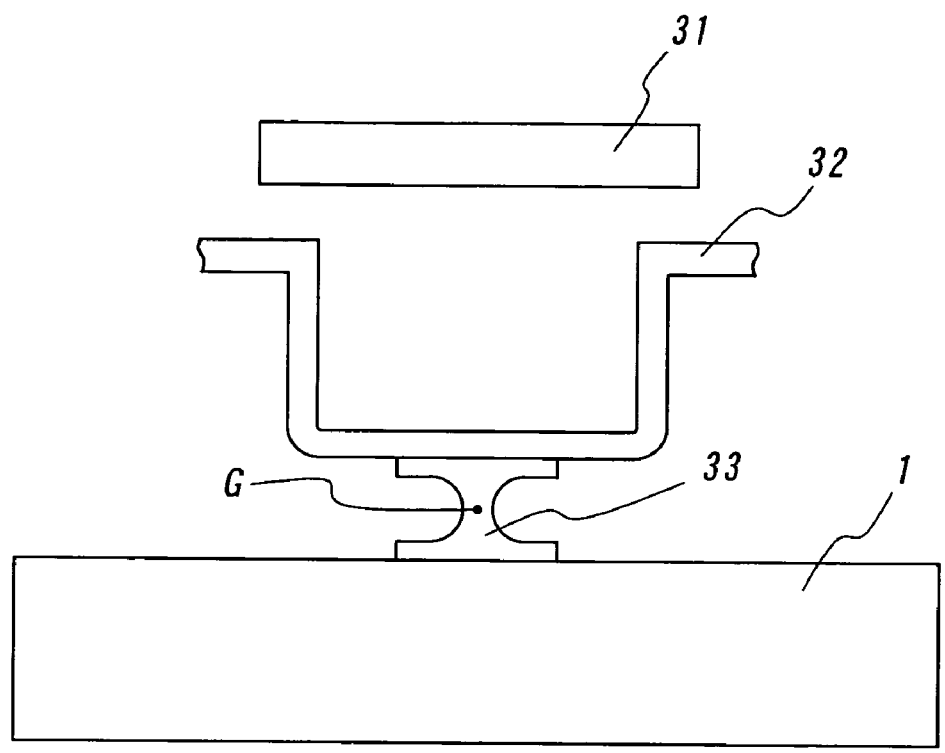
FIG. 14 is a view showing a configuration of the major part of a third modified embodiment.

FIG. 14 is a view showing a configuration of the major part of a third modified embodiment. In this third modified embodiment, the pivot 33 is previously molded into a drum shape from a silicone rubber, for example, and one and the other ends of the pivot 33 are bonded to the central portion of the arm 32 and the central portion of the rear surface of the mirror 1, respectively. Previously molding the pivot 33 in this way allows easily obtaining various shapes for the pivot 33.

Figure 15:
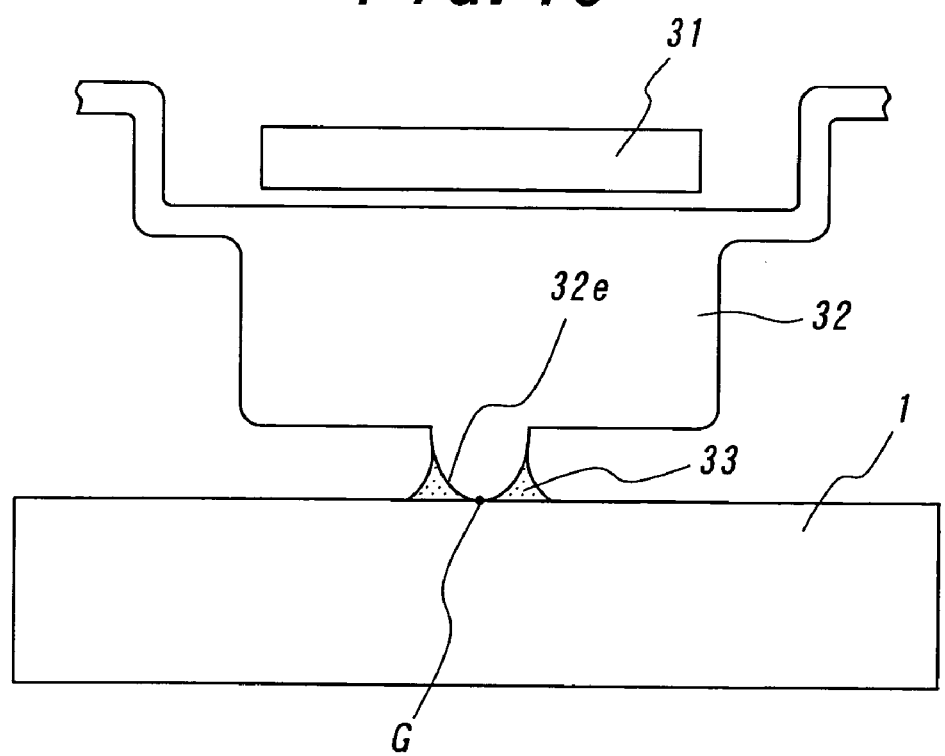
FIG. 15 is a view showing a configuration of the major part of a fourth modified embodiment.

FIG. 15 is a view showing a configuration of the major part of a fourth modified embodiment. In this fourth modified embodiment, the central portion of the arm 32 is formed with a conical or hemispherical projection 32e such that the tip end of the projection 32e abuts onto the rear surface of the mirror 1 so as to coat and cure the damping agent around the abutting portions, thereby forming the pivot 33. In this way, the spacing between the projection 32e and mirror 1 is fixed by the damping agent, thereby avoiding unnecessary vibrations of the moving body due to collision between the rigid arm 32 and the mirror 1 upon external vibrations.

Figure 16:
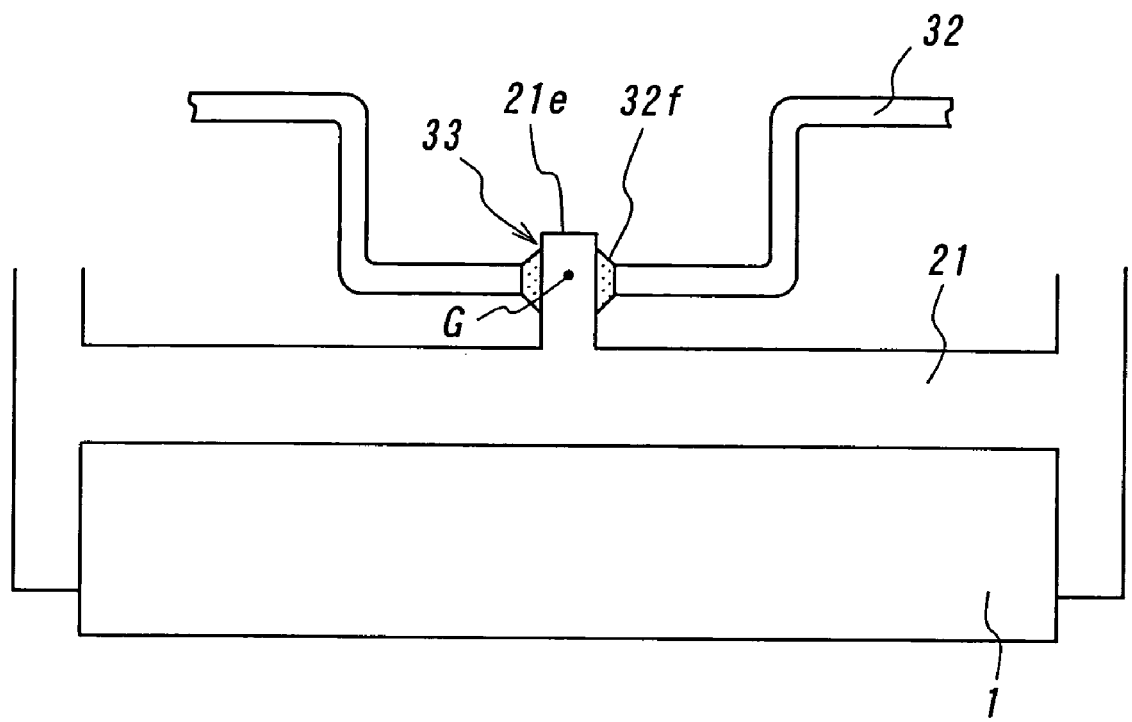
FIG. 16 is a view showing a configuration of the major part of a fifth modified embodiment.

FIG. 16 is a view showing a configuration of the major part of a fifth modified embodiment. In this fifth modified embodiment, the central portion of the arm 32 is formed with a hole 32f while providing a wall of the coil holder 21 at the rear surface side of the mirror 1, and the wall is formed with a projection 21e, such that the projection 21e is inserted into the hole 32f so as to inject the damping agent into the gap between the hole 32f and projection 21e, thereby forming the pivot 33.

Figure 17:
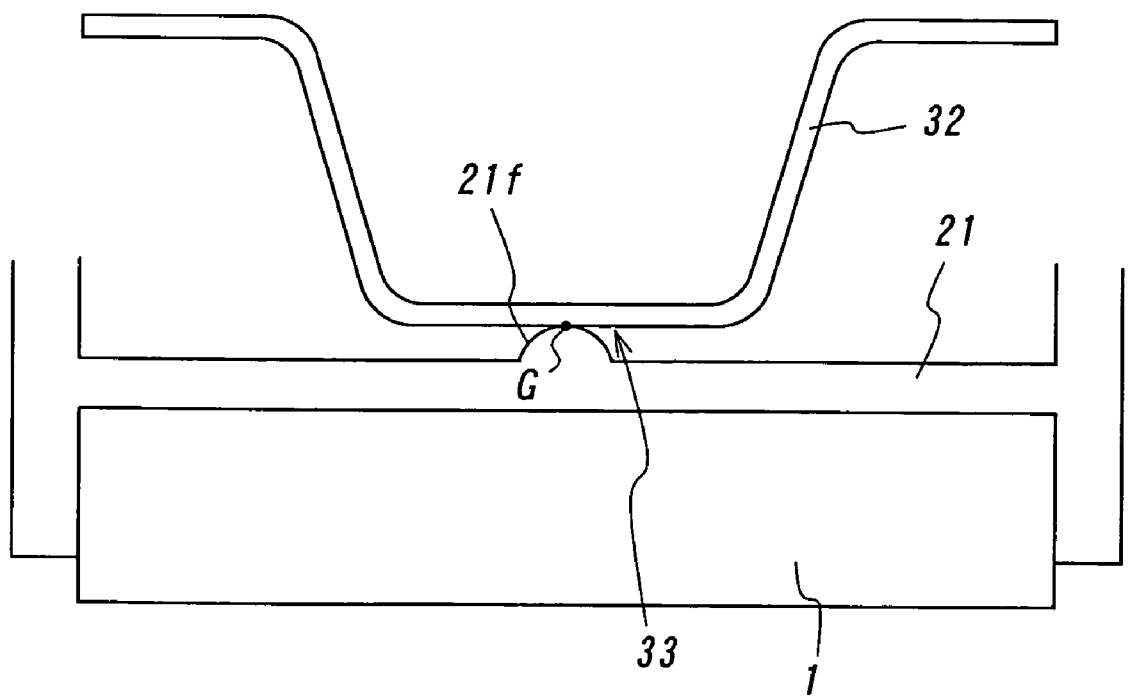
FIG. 17 is a view showing a configuration of the major part of a sixth modified embodiment.

FIG. 17 is a view showing a configuration of the major part of a sixth modified embodiment. In this sixth modified embodiment, the arm 32 is formed of a thin spring while providing a wall of the coil holder 21 at the rear surface side of the mirror 1, such that the wall is formed with a conical or hemispherical projection 21f so as to urge the central portion of the arm 32 onto the projection 21f, thereby constituting the pivot 33. This eliminates the necessity of a damping agent and urges the arm 32 to abut onto the projection 21f by the spring force of the arm itself, so that the arm 32 is not separated from the projection 21f even upon external vibrations.

Note that the present invention is not limited to the configurations of the above-described embodiment and modified embodiments, and can be variously changed and modified. For example, although the mirror is tilted in the above description, it is possible to adopt a hologram element, prism, lens or a combination of these optical elements, instead of the mirror.

Figure 18:
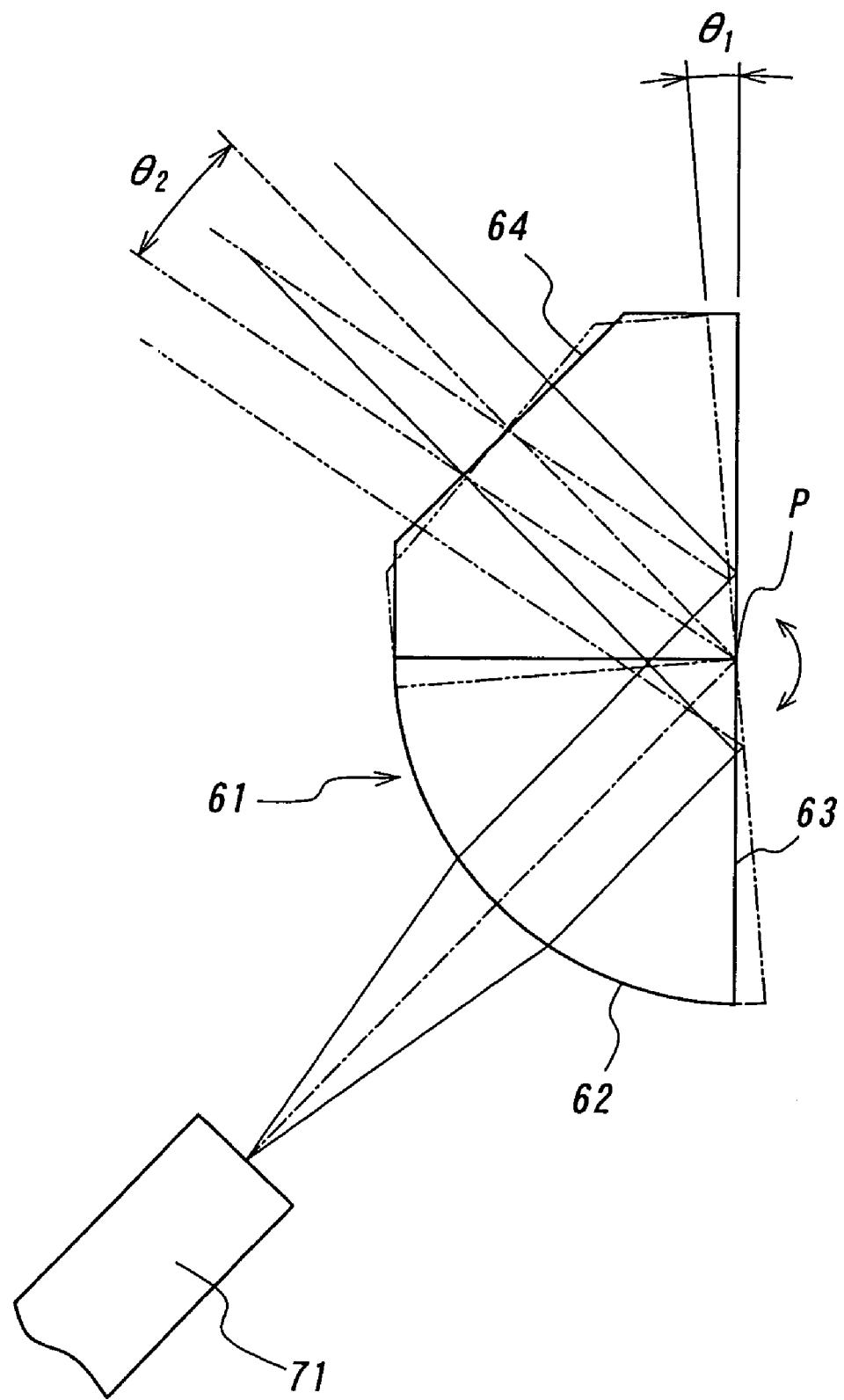
FIG. 18 is a view showing a modified embodiment of the optical deflecting element.

FIG. 18 shows an example therefor, for driving and tilting a combined optical element 61. This combined optical element 61 has a lens surface 62, a reflection surface 63 and a prism-like emitting surface 64, and is integrally molded of an amorphous polyolefin resin so as to be fixed to the moving body tiltably around a point P within the reflection surface 63. Note that the lens surface 62 is formed into a spherical shape having its curvature center which coincides the point P. In this way, the emitting light from an optical fiber 71 is incident on the lens surface 62 and concentrated by it into collimated light flux, which is then reflected by the reflection surface 63 and emitted from the emitting surface 64, thereby deflecting the emitting light from the optical fiber.

According to the configuration shown in FIG. 18, when the combined optical element 61 is tilted by $\theta_1$ (such as 5°) around the point P, the emitting light from the emitting surface 64 is tilted by $\theta_2$ (12.5°), thereby enhancing the sensitivity by virtue of the refractive function of the emitting surface 64. In addition, the emitting light from the optical fiber 71 is converted by the lens surface 62 into the collimated light flux, thereby excluding the necessity of an independent collimator lens between the optical fiber 71 and combined optical element 61, to thereby allow reducing the number of parts and downsizing the optical element. Moreover, since the curvature center of the lens surface 62 coincides the tilting center point P of the combined optical element 61, the lens function by the lens surface 62 is unchanged even when the combined optical element 61 is tilted, so that the light from the optical fiber 71 is never displaced by the lens surface 62.

Figure 22:
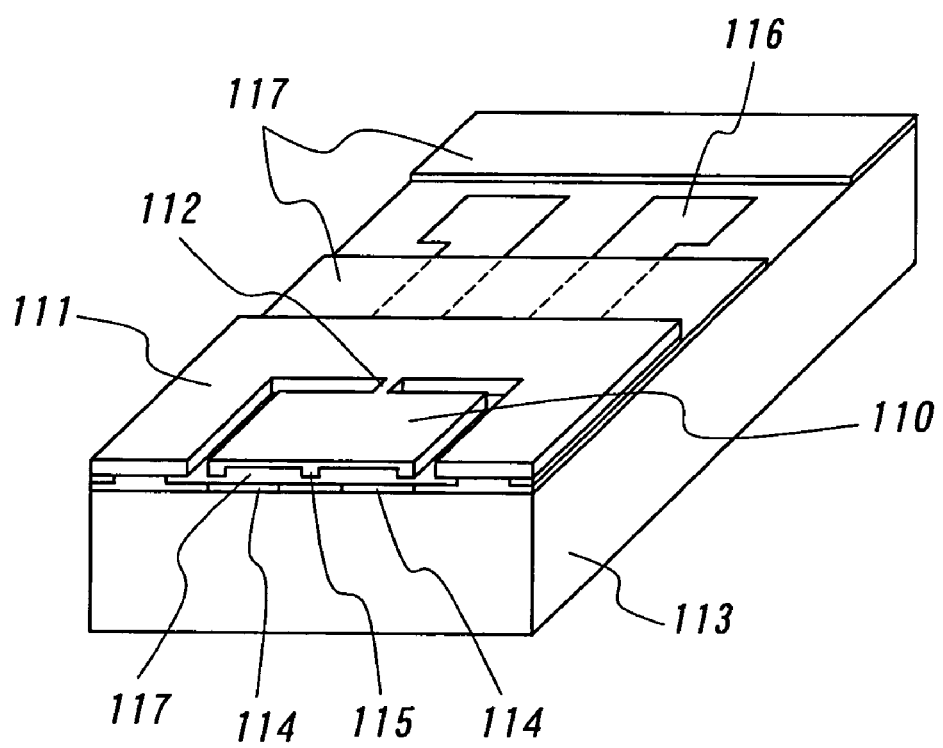
FIG. 22 is a view showing another conventional example.
Figure 23:
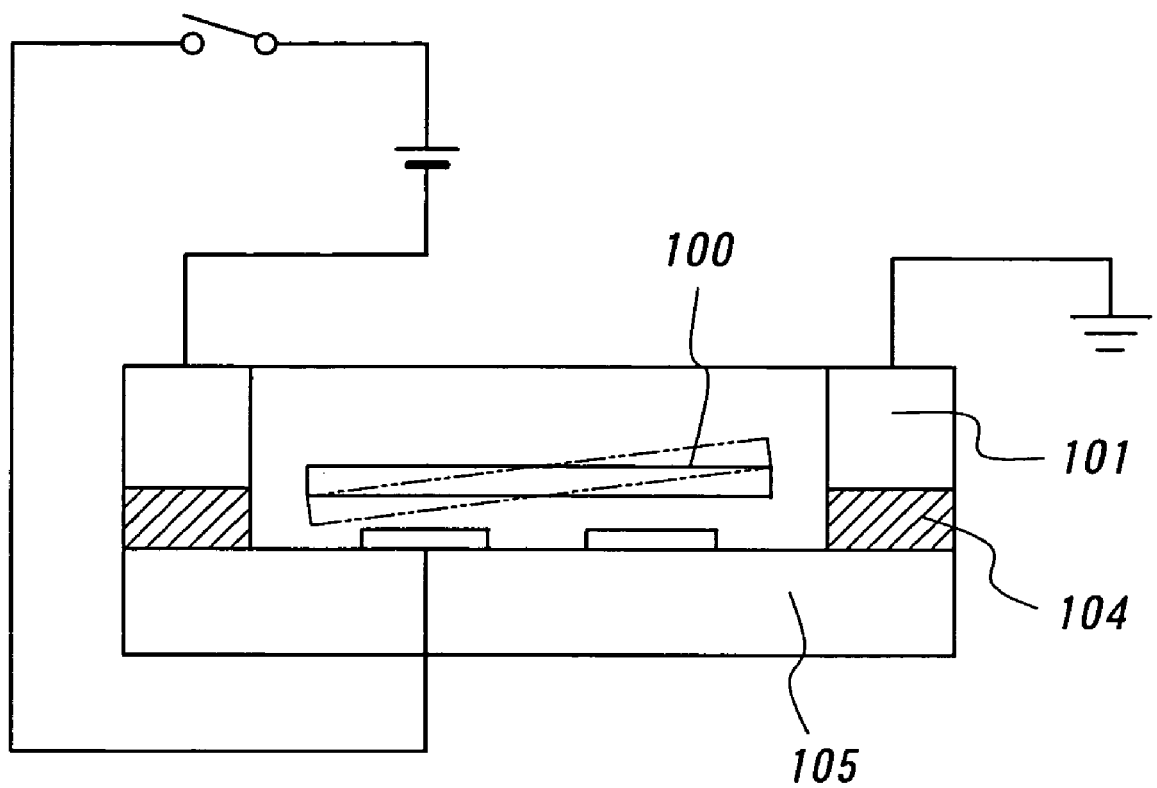
FIG. 23 is a view for explaining an action of the optical deflecting device shown in FIG. 21.

Although the PSD 18 has been adopted as a photodetector constituting the angle sensor for the mirror 1 in the above description, it is possible to use a photodiode to quadripartite light in the X-direction and Y-direction shown in FIG. 3 instead of the PSD 18. In addition, the present invention is not limited to a situation for tilting an optical deflecting element around two axes, and can effectively be applied to a situation for tilting it around one axis. In such a situation, it is exemplarily possible to arrange two coils on the moving body side so as to generate a rotating torque around one axis such that these coils are not connected with each other on the moving body but serially connected via springs 23 for power feeding. Moreover, although the above-described embodiment is of a moving coil type for arranging the coils and magnets on the moving body and stationary body, respectively, it is possible to use a moving magnet type for arranging magnets and coils on the moving body and stationary body, respectively. The electrostatic driving of the conventional example shown in FIG. 22 will also do. As the supporting members, it is also possible to use linear wires or molded plastic body, or the etched silicon substrate as shown in FIG. 22, other than the metal foil.

In the above embodiment, splitting each of the four springs 23 into halves in the thickness direction via thin non-conductive spacer (of 0.01 mm thickness, for example) enables to provide totally eight independent power feeders, thereby allowing independently feeding power to totally four coils of the first and second coils 26, 27, or thereby allowing to arrange photodetectors for a sensor on the moving body and to feed power to the photodetectors through the springs in addition to power feeding to two sets of coils of the coils 26, 27.

Figure 19:
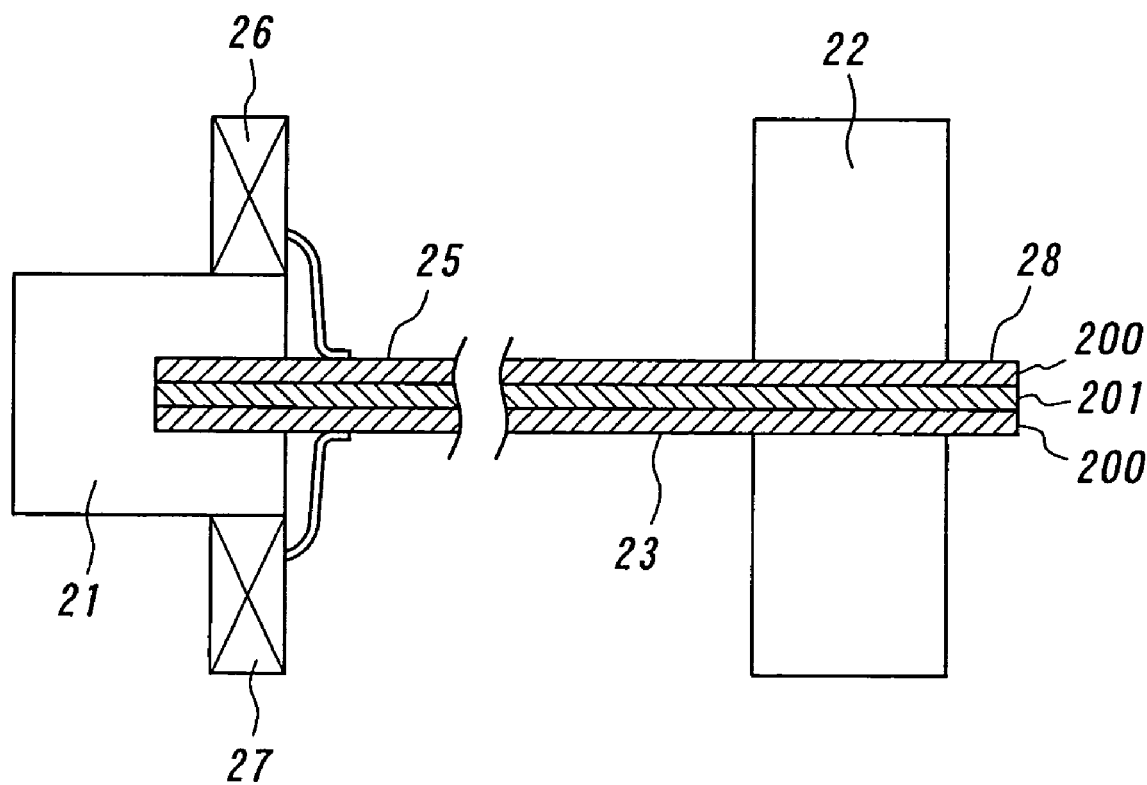
FIG. 19 is a view showing a configuration of major part of the seventh modified embodiment of the optical deflecting device shown in FIG. 2.

FIG. 19 is a view showing a configuration of the major part of a seventh modified embodiment. In this seventh modified embodiment, each spring 23 has a three-layer structure comprising two beryllium copper foils 200 each having a thickness of 10 µm and an acrylic adhesive tape 201 sandwiched therebetween. The two beryllium copper foils 200 are electrically insulated from each other and integrally held to each other, by the adhesive tape 201. Identically to the above embodiment, each spring 23 is insert-molded into the coil holder 21 and magnet holder 22. Further, terminals of coils 26, 27 are soldered to soldering portions 25 at both sides of the spring 23, respectively.

In this way, two power feeders can be provided by making each spring 23 into the three-layer structure, and totally eight power feeders can be provided when the optical deflecting device has four springs 23 identically to the above embodiment.

The present invention is not limited to an optical deflecting device used to switch an optical-path for optical communication, and can be effectively applied to an optical deflecting device used for a measuring instrument, an optical writing/reading pickup, and the like.

Figure 20:
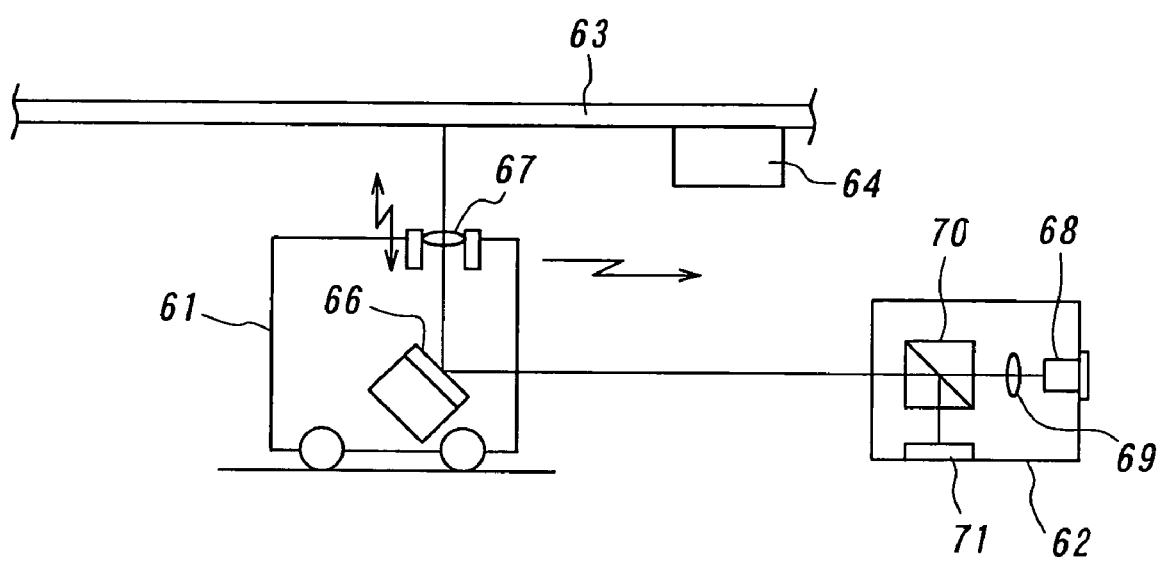
FIG. 20 is a view for explaining deflecting action in another embodiment of an optical deflecting device according to the present invention.
Figure 21:
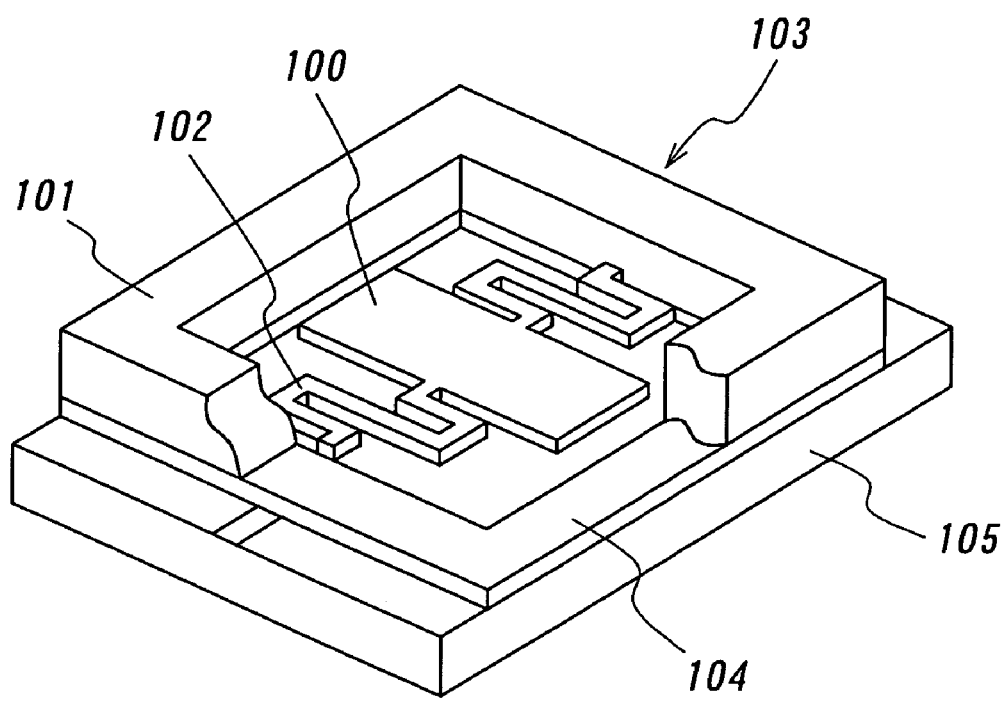
FIG. 21 is a view showing an example of a conventional optical deflecting device.

FIG. 20 is a constitutional view showing an example of an optical information read-write device. As shown in FIG. 20, the moving body 61A is provided with a galvanometer mirror 66 constituted of the optical deflecting device of the present invention such as shown in FIGS. 2 through 19, an object lens 67, and a focus actuator (not shown). The stationary body 62A is provided with a semi-conductor laser 68, a collimator lens 69, a beam splitter 70 and a photodetector 71.

Light beam emitted from the semiconductor laser 68 is projected onto an optical disk 63A after sequentially passing through the collimator lens 69, beam splitter 70, galvanometer mirror 66 and object lens 67, and the reflected light from the optical disk is received by a photodetector 71 after passing through the object lens 67, galvanometer mirror 66 and beam splitter 70, thereby obtaining an RF signal, focus error signal and tracking error signal. In this way, the optical deflecting device of the present invention can also be used preferably as a galvanometer mirror for the optical information read-write device.

INDUSTRIAL APPLICABILITY

According to the present invention, at least two optical deflecting elements facing each other are held by the moving body, and the moving body is supported by the stationary body tiltably around at least a first axis via supporting means having a first supporting member pivot-connected to the moving body between these two optical deflecting elements so as to drive the moving body around the first axis by first driving means, thereby allowing to suppress undesirable vibrations of the moving body which holds the optical deflecting elements and allowing a plurality of optical deflecting elements to be easily arranged.

The invention claimed is:

1. An optical deflecting device comprising:
two optical deflecting elements, each comprising a deflecting surface for deflecting a direction of light;
a first supporting member for rotatably holding a moving body, including at least the optical deflecting elements, with respect to a stationary body;
a driving mechanism for rotating the optical deflecting elements around a predetermined axis of rotation; and
a pivot which couples the moving body to the stationary body and which is disposed on a center of gravity of the moving body at a position located between the two optical deflecting elements.

2. The optical deflecting device of claim 1, wherein the pivot is disposed substantially perpendicularly to the deflecting surface.

3. The optical deflecting device of claim 1, wherein the pivot is disposed near a driving center of the driving part.

4. The optical deflecting device of claim 1, wherein the pivot is disposed at a substantially central portion of the moving body between rear surface sides of the deflecting elements, and wherein the respective rear surface sides are opposite to the respective deflecting surfaces of the deflecting elements.

5. The optical deflecting device of claim 1, wherein the pivot is disposed near the axis of rotation.

6. The optical deflecting device of claim 1, wherein the pivot has a damping function.

7. The optical deflecting device of claim 1, wherein the pivot is made of one of gel, rubber, grease and oil.

8. The optical deflecting device of claim 1, wherein the pivot is line symmetric about a line that is substantially perpendicular to the optical deflecting elements and that extends through a center of the pivot.

9. The optical deflecting device of claim 1, wherein the first supporting member comprises an opening, and the pivot fills the opening of the first supporting member.

10. The optical deflecting device of claim 1, wherein the first supporting member comprises a convex part disposed to abut against the moving body, and the pivot covers a portion of the convex part that abuts against the moving body.

11. The optical deflecting device of claim 1, wherein the pivot is formed by injecting a predetermined material into a gap between the moving body and the first supporting member.

12. The optical deflecting device of claim 1, wherein the pivot is firmly bonded to the moving body and the first supporting member.

13. The optical deflecting device of claim 1, wherein the first supporting member comprises a convex part and the moving body comprises a concave part, and
wherein the pivot fills a space between the convex part of the first supporting member and the concave part of the moving body.

14. The optical deflecting device of claim 1, wherein the first supporting member comprises an opening and the moving body comprises a convex part extending into the opening of the first supporting member, and
wherein the pivot fills the opening of the first supporting member around the convex part.

15. The optical deflecting device of claim 1, wherein the pivot is disposed integrally with the moving body substantially in a middle portion of the moving body so as to abut against the first supporting member.

16. The optical deflecting device of claim 1, wherein the optical deflecting elements utilize one of reflection and refraction.

17. The optical deflecting device of claim 1, further comprising:
a second supporting member rotatably supporting the optical deflecting elements around the axis of rotation.

18. The optical deflecting device of claim 1,
wherein the second supporting member extends in a direction substantially parallel to the deflecting surfaces.

19. The optical deflecting device of claim 16, wherein the second supporting member has a function for feeding power to the moving body.

20. The optical deflecting device of claim 1, wherein the optical deflecting elements are rotatable around another axis of rotation substantially orthogonal to said predetermined axis of rotation.

21. The optical deflecting device of claim 1, wherein the driving part includes a coil disposed at the moving body and a magnet disposed around the coil.

22. The optical deflecting device of claim 21, wherein the coil includes a first coil and a second coil formed to sandwich the second supporting member therebetween.

23. The optical deflecting device of claim 1, further comprising:
a second supporting member rotatably supporting the optical deflecting elements around the axis of rotation;
wherein the optical deflecting elements comprise a first optical deflecting element and a mirror disposed at a rear surface side of the first optical deflecting element and substantially parallel to the deflecting surface of the first optical deflecting element.

24. The optical deflecting device of claim 23, wherein the first supporting member is bent into a stepwise shape so as to form a concave part, and the mirror is disposed within the concave part.

25. The optical deflecting device of claim 1, wherein the two optical deflecting elements face each other.

26. The optical deflecting device of claim 1, wherein the respective deflecting surfaces of the two optical deflecting elements face away from each other.

27. The optical deflecting device of claim 1, wherein at least a part of the first supporting member is arranged between the optical deflecting elements.

28. The optical deflecting device of claim 1, wherein the first supporting member is bent into a stepwise shape so as to form a concave part, and one of the optical deflecting elements is disposed within the concave part.

29. The optical deflecting device of claim 1, further comprising a sensor for detecting a degree of tilting of one of the optical deflecting elements.

* * * * *